US 12,403,501 B2

(12) United States Patent
Li et al.

(10) Patent No.: US 12,403,501 B2
(45) Date of Patent: Sep. 2, 2025

(54) METHOD FOR FORMING ASSEMBLED NANOMATERIAL COATING BY SOLUTE-ASSISTED ASSEMBLY, AND RESULTING PRODUCTS

(71) Applicant: Villanova University, Villanova, PA (US)

(72) Inventors: Bo Li, Malvern, PA (US); Liang Zhao, Bryn Mawr, PA (US)

(73) Assignee: Villanova University, Villanova, PA (US)

( * ) Notice: Subject to any disclaimer, the term of this patent is extended or adjusted under 35 U.S.C. 154(b) by 364 days.

(21) Appl. No.: 17/989,823

(22) Filed: Nov. 18, 2022

(65) Prior Publication Data
US 2023/0286015 A1    Sep. 14, 2023

Related U.S. Application Data

(60) Provisional application No. 63/281,251, filed on Nov. 19, 2021.

(51) Int. Cl.
*B05D 1/18* (2006.01)
*B01F 23/40* (2022.01)
(Continued)

(52) U.S. Cl.
CPC .............. *B05D 1/18* (2013.01); *B01F 23/405* (2022.01); *B01F 31/80* (2022.01); *B05D 7/24* (2013.01); *C09D 1/00* (2013.01)

(58) Field of Classification Search
CPC ... B05D 1/18; B05D 1/28; B05D 7/24; B05D 2201/00; B05D 2401/20; B05D 2401/21;
(Continued)

(56) References Cited

U.S. PATENT DOCUMENTS 7,785,901 B2    8/2010    Harnack et al.
9,376,593 B2 *  6/2016    Maghsoodi .......... C03C 17/007
(Continued)

FOREIGN PATENT DOCUMENTS

RU           2259871 C2 *  9/2005  ............... B01J 13/00
WO    WO-2016022503 A1 *  2/2016  ......... A61K 47/6923

OTHER PUBLICATIONS

An et al., "Surface-agnostic highly stretchable and bendable conductive MXene multilayers,"; Science Advances—Research Article, Mar. 9, 2018, Sci. Adv., 4(3), eaaq0118. • DOI: 10.1126/scidv.aaq0118, https://www.science.org/doi/10.1126/eciadv.aaq0118, pp. 1-8.

(Continued)

*Primary Examiner* — William P Fletcher, III
(74) *Attorney, Agent, or Firm* — Duane Morris LLP

(57) ABSTRACT

A method for forming a nanomaterial coating through solute-assisted assembly includes steps of: providing a mixture comprising a solvent, a solute, and a nanomaterial or particle; applying sonication to the mixture; and contacting a substrate with the mixture so as to form a coating of the nanomaterial or the particle onto the substrate. The solute is selected from a salt, a sugar, an acid, a base, or a combination thereof. The resulting products comprising the nano- (Continued)

material coating include articles for flexible electronics and functional textiles.

14 Claims, 27 Drawing Sheets

(51) Int. Cl.
  *B01F 31/80* (2022.01)
  *B05D 7/24* (2006.01)
  *C09D 1/00* (2006.01)
(58) Field of Classification Search
  CPC .......... B01F 23/405; B01F 31/80; C09D 1/00; C09D 7/61; C09D 7/70; C08J 7/04; C08J 7/056; C08J 7/06; C08J 2383/04; C08J 2425/06; C08J 2427/18; B82Y 30/00; B82Y 40/00; C08K 7/00
  See application file for complete search history.

(56) References Cited

U.S. PATENT DOCUMENTS

| | | |
|---|---|---|
| 9,461,185 B2 | 10/2016 | Nair et al. |
| 10,252,289 B2 | 4/2019 | Hoerr et al. |
| 2019/0201296 A1 | 7/2019 | Wang et al. |

OTHER PUBLICATIONS

Zhang et al., "Direct Self-Assembly of MXene on Zn Anodes for Dendrite-Free Aqueous Zinc-Ion Batteries," Angew, Chem. Int. Ed. 10.1002/anie.202012322, https://doi.org/10.1002/anie.202012322, 6 pages.

Zhao et al., "Wafer-Scale Full-Coverage Self-Limiting Assembly of Particles on Flexible Substrates," ACS Applied Materials & Interfaces, Sep. 29, 2022, https://doi.org/10.1021/acsami.2c14149, ACS Appl. Mater, Interfaces 2022, 14, pp. 46095-46102.

Zhou et al., "Sono-Assisted Surface Energy Driven Assembly of 2D Materials on Flexible Polymer Substrates: A Green Assembly Method Using Water," ACS Applied Materials & Interfaces, DOI: 10.1021/acsami.9b10469, ACS Appl. Mater. Interface 2019, 11, pp. 33458-33464.

Zhou et al., "Ultrafast assembly and healing of nanomaterial networks on polymer substrates for flexible hybrid electronics," Applied Materials Today 22 (2021) 100956, www.elseview.com/locate/apmt, doi: 10.106/j.apmt.2021.100956, pp. 1-8.

Zhu, et al., "Fluid-Assisted Sorted Assembly of Graphene on Polymer", Langmuir 2020, 36, pp. 5608-5617, https://dx.doi.org/10.1021/acslangmuir.0c00844.

\* cited by examiner

METHOD FOR FORMING ASSEMBLED NANOMATERIAL COATING BY SOLUTE-ASSISTED ASSEMBLY, AND RESULTING PRODUCTS

PRIORITY CLAIM AND CROSS-REFERENCE

This application claims the benefit of U.S. Provisional Application No. 63/281,251, filed Nov. 19, 2021, which application is expressly incorporated by reference herein in its entirety.

STATEMENT REGARDING FEDERALLY SPONSORED RESEARCH

This invention was made with government support under 2003077, 2221102, and 2018852 awarded by the National Science Foundation. The government has certain rights in the invention.

FIELD OF THE INVENTION

The disclosure relates to nanomaterials and coatings generally. More particularly, the disclosed subject matter relates to a method for forming a nanomaterial coating on a substrate, and the resulting products.

BACKGROUND

Functional coating and electronics require assembling nano/microparticles on target substrates such as polymers, ceramics, and metals. The market of functional coatings and electronics has a great potential, but techniques for high rate, cost-efficient and environment-friendly manufacturing of functional coatings and electronics from nano/microparticles are limited. The processing of nano/microparticles is very expensive and time-consuming.

The existing dip coating technologies are based on an evaporation driven assembly process with a very low coating speed. The deposition happens at the solid-liquid-vapor contact line. To obtain a stable deposition, the receding of the solid-liquid-vapor contact line should be stable, which requires a delicate balance between substrate withdrawal and solution evaporation. Therefore, the withdrawal speed of the dip coating is difficult to increase. Also, a stable and well-dispersed solution is necessary for the preparation of a uniform film. Therefore, organic solvent or water with surfactants as the solvent has been widely adopted. Organic solvents or water with surfactants based aqueous solution was used for nano/microparticle dispersion. Usually, post-treatment will be necessary to remove the organic solvents and surfactants.

SUMMARY OF THE INVENTION

The present disclosure provides a method for forming a nanomaterial coating or a particle coating on a substrate through solute-assisted assembly, and the resulting products comprising such a nanomaterial coating or a particle coating.

In accordance with some embodiments, a method for forming a nanomaterial coating or a particle coating comprises steps of: providing a mixture comprising a solvent, a solute, and a nanomaterial or particle; applying sonication to the mixture; and contacting a substrate with the mixture so as to form a coating of the nanomaterial or the particle onto the substrate. The nanomaterial may be one dimensional (1D), two dimensional (2D), or three dimensional (3D) nanomaterials. The particles can be nanoparticles or microparticles. The solute may be a salt, a sugar, an acid, a base, or any combination thereof. The solute is soluble in the solvent. The nanomaterial or particle is not soluble in the solvent. The assembly of the nanomaterial or particle may be assisted in an acoustic field under sonication, or a shear field induced by dip coating, and a shear field induced by mechanical stirring. For example, the nanomaterial may be dispersed, pre-treated, and/or exfoliated after sonication is applied.

The nature of the nanomaterials or particle and the substrate can be similar or different. In some embodiments, the nature of the nanomaterials or particle and the substrate are opposite. For example, the nanomaterial or particle is hydrophilic while the substrate is hydrophobic, or the nanomaterial or particle is hydrophobic while the substrate is hydrophilic.

Examples of a suitable nanomaterial or particle include, but are not limited to, a metal, an oxide, a metal hydroxide not soluble in water, a metal salt not soluble in water, a transition metal chalcogenide, a carbide, a nitride, a carbonitride, a single element material (e.g., Se, carbon-based nanoparticle, nanotube, or nanofiber, metal particles), a polymer, a protein, and any combination thereof. The substrate can be any suitable substrate. In some embodiments, the substrate comprises a polymer, a glass substrate, a ceramic sheet, a metal foil, a paper, or any combination thereof.

The substrate is contacted with the mixture through an acoustic agitated process, a dip-coating process, a roll-to-roll process, a mechanical stirring process, or a combination thereof. For example, a dip coating process or a roll-to-roll process is used in some embodiments.

In some embodiments, the coating comprises layered nanomaterials, and the layered nanomaterials have a size of spacing, which is controlled by species of the solute.

The nanomaterial or particle may have a suitable size, for example, in a range of from about 1 nm to about 10 microns. For example, the nanomaterial or particle comprises nanomaterials having at least one dimension in a range of from about 1 nm to about 1,000 nm, for example, from about 10 nm to about 1,000 nm. In some embodiments, the nanomaterial or particle comprises microparticles having a diameter in a range of from about 1 micron to about 10 microns.

In some embodiments, the solute comprises one or more salts, which may be water-soluble. The nanomaterial or particle is hydrophilic, and the substrate comprises a polymer, which may be hydrophobic.

In some embodiments, the solvent is water or comprises water and another solvent. The mixture contains no surfactant.

The present disclosure also provides a resulting article, which comprises a substrate and a coating disposed on the substrate. The coating comprises a nanomaterial or particle and a solute distributed in the coating. The solute may be a salt, a sugar, an acid, a base, or any combination thereof. The solute is soluble in a solvent such as water or water-containing mixture solvent. The nanomaterial or particle may be hydrophilic while the substrate is hydrophobic, or the nanomaterial or particle is hydrophobic while the substrate is hydrophilic. The nanomaterial or particle and substrate may be both hydrophilic or hydrophobic.

The nanomaterial or particle may be a metal, an oxide, a metal hydroxide not soluble in water, a metal salt not soluble in water, a transition metal chalcogenide, a carbide, a nitride, a carbonitride, a single element material, a polymer, a protein, or any combination thereof. The substrate may comprise a polymer, a glass sheet, a metal foil, a paper, or a combination thereof.

The nanomaterial or particle may have a suitable size, for example, in a range of from about 1 nm to about 10 microns. For example, the nanomaterial or particle comprises nanomaterials having at least one dimension in a range of from about 1 nm to about 1,000 nm, for example, from about 10 nm to about 1,000 nm. In some embodiments, the nanomaterial or particle comprises microparticles having a diameter in a range of from about 1 micron to about 10 microns.

In some embodiments, the solute comprises one or more water-soluble salts. The nanomaterial or particle is hydrophilic, and the substrate comprises a polymer, which may be hydrophobic.

In some embodiments, the coating comprises layered nanomaterials, and the layered nanomaterials have a size of spacing controlled by species of the solute.

The coating may have a thickness in a range of from about 1 nanometer to about 100 microns, for example, from 1 nm to 100 nm, from about 1 micron to 100 microns, or any suitable thickness. In some embodiments, the nanomaterials or particles are chemically bonded with each other in the coating.

The resulting article product comprising the assembled nanomaterial coating and the substrate, such as a polymer substrate, can be utilized to make flexible electronics, functional textile, thermal management materials, and any other materials of suitable applications.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

FIG. 14 (C) shows the EDS mapping of K element in the image as shown in FIG. 14(B).

FIG. 18(C) shows SEM image of Au nanoparticles assembled on nickel foil substrate assisted by NaCl salt. FIG. 18(D) shows digital image of $Ti_3C_2T_x$ assembled on $Si_3N_4$ ceramic substrate assisted by NaCl salt.

FIGS. 27 (C) and (D) show the temperature profiles of the top surface of the uncoated and the coated samples of FIGS. 27(A) and (B) when placed on a hot plate with temperature of 202-205° C.

DETAILED DESCRIPTION

Figure 1:
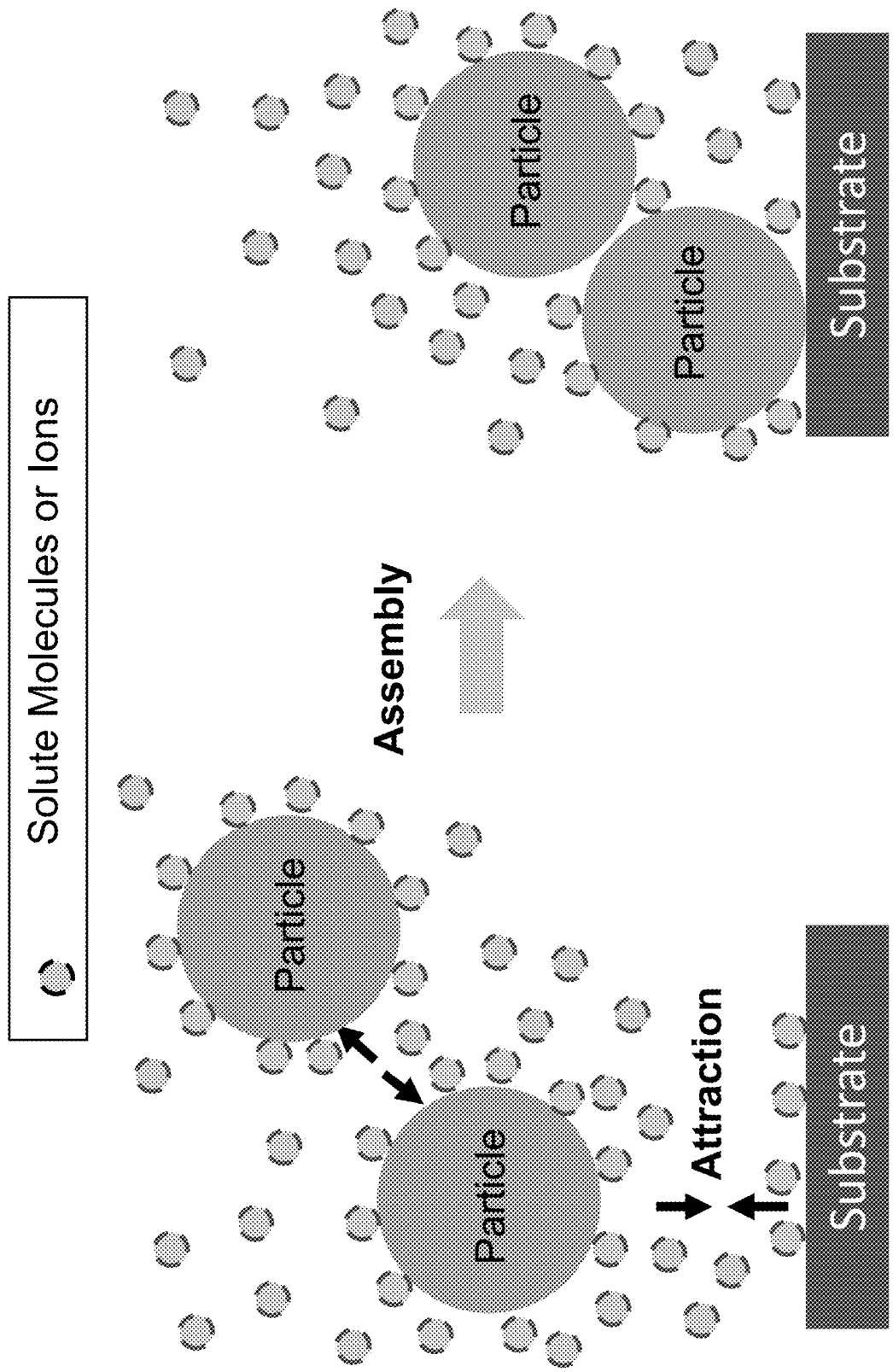
FIG. 1 illustrates an exemplary method for forming a nanomaterial coating or a microparticle coating through a solute assisted assembly process in accordance with some embodiments.

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. Thus, for example, a reference to "a nano structure" is a reference to one or more of such structures and equivalents thereof known to those skilled in the art, and so forth. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive; as another example, the phrase "about 8%" preferably (but not always) refers to a value of 7.2% to 8.8%, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

The term "hydrophobic" and "hydrophilic" used herein are understood to have the same meaning in the chemical and material science. In some embodiments, a hydrophobic material or substrate is understood to have a contact angle of deionized water drop on such material or substrate in a range of from 80 to 180 degree (e.g., 90-150, 100-180 degree). In some embodiments, a hydrophilic material or substrate is understood to have a contact angle of deionized water drop on such material or substrate in a range of from 0 to 80 degree (e.g., 0-30, 20-80 degree), without including 80 degree.

The term "nanomaterial" as used herein is understood to encompass any material having a size of at least one dimension (such as diameter for spherical or near-spherical particles) in nanometer-sized range, for example, from 1 nm to 1,000 nm, from 10 nm to 1,000 nm, or from 50 nm to 1,000 nm. Nanomaterials include 0D nanomaterial such as quantum dots, 1D nanomaterial such as single-wall carbon nanotubes (SWNT), 2D nanomaterials such as graphene, h-BN and $MoS_2$, and 3D nanomaterials such as carbon black, metal oxide, and polymer nanoparticles. The term "three-dimensional (3D) nanomaterial or nanoparticle" is used to distinguish from 1D and 2D nanomaterials. The size of nanoparticle or nanomaterials is determined by known methods. For example, a standard and accurate method is transmission electron microscopy (TEM).

The term "nanoparticle" as used herein is understood to encompass a nanomaterial having a three-dimensional (3D) shape and having a dimension in a nanometer-sized range, for example, from 10 nm to 1,000 nm, or from 50 nm to 1,000 nm. Examples of such a 3D shape include, but are not limited to a spherical or near-spherical shape, a cube or cuboid, or any other regular shape. Most of the particles have a spherical or near-spherical shape, and such a dimension is the particle diameter.

The term "microparticle" as used herein is understood to encompass a particle having a three-dimensional shape and having a diameter in micrometer-sized range, for example, from 1.1 micron to 1,000 microns (e.g., 5-500 microns or 10-100 microns). Examples of such a 3D shape include, but are not limited to a spherical or near-spherical shape, a cube or cuboid, or any other regular shape. Most of the particles have a spherical or near-spherical shape, and such a dimension is the particle diameter.

The term "MXenes" in material science refers to a class of two-dimensional inorganic compounds. MXene is a compound composed of layered nitrides, carbides, or carbonitrides of transition metals. In some embodiments, MXene is composed of a-few-atoms-thick layers of carbide, nitride, or carbonitride of transition metal. A single layer of MXene may have a thickness as thin as 1-2 nanometers. For example, titanium carbide $Ti_3C_2T_x$ is one of the exemplary MXenes used in the present disclosure. Multilayer $Ti_3C_2T_x$ MXene nanoflakes are available commercially, for example, from American Elements in Los Angeles, Calif. $T_x$ represents possibly a small amount of functional groups (e.g., —F, —O, OH) attached on the surface of MXene during its synthesis process, where x is in a range of from 0 to 2.

Conventional coating mechanisms have multiple limitations. To enable high-quality, uniform coatings, both methods require fine control over the molecular interactions among the solvent, nanomaterial, and the substrate (e.g., textiles). More specifically, conventional assembly requirements include: (1) good wetting of the substrate, because nanomaterials dissolved or suspended in the solvent can only deposit at the substrate locations wetted by the solvent, (2) good dispersion of nanomaterials in the solvent, and (3) strong nanomaterial-substrate interactions to enable strong and durable binding. To promote the high-efficiency, scalable, and eco-friendly manufacturing of coatings, water will be used as the solvent, which however greatly limits the choice of nanomaterials and polymers. Taking nanomaterial-on-polymer substrate assembly systems as an example, most of the successful systems from the literature and practice are hydrophilic nanomaterials on hydrophilic substrates which is consistent with the conventional assembly requirements mentioned above.

However, such requirements create challenges to achieve the assembly of a large collection of substrates and functional nanomaterials systems. These challenging systems include hydrophobic nanomaterials on hydrophilic substrate, hydrophilic nanomaterials on hydrophobic substrate, and systems showing weak interactions between substrate and nanomaterials.

To enable assembly for these challenging nanomaterial-polymer systems, traditionally, three types of surface treatment strategies are applied to the nanomaterials and/or polymers to enhance the nanomaterial-polymer-water interactions: 1) surface activation such as plasma treatment, and acid/base treatment, 2) adhesive polymer coating (e.g., polydopamine), and 3) surfactant grafting (e.g., polyelectrolyte and protein). The drawbacks are significant. With surface activation strategies (e.g., plasma treatment), structural integrity of the polymers and nanomaterials can be damaged leading to compromised mechanical, electrical, thermal, and other physical properties. In addition, the polymer surface is not chemically uniform because of the complicated chemical configurations and conformations of polymer chains, making it hard to guarantee a uniform chemical functionalization through these surface activation methods. For adhesive polymer coating and surfactant coating strategies, the added polymers or surfactants will mix with nanomaterials and diminish their functionalities. Moreover, surfactants are usually toxic to the environment. For these reasons, a generic, efficient, non-destructive, and eco-friendly assembly method is highly desired to unlock the diverse assembly systems.

The present disclosure provides a method for forming a coating such as a nanomaterial coating or a microparticle coating on a substrate through solute-assisted assembly, and the resulting products comprising such nanomaterial coating.

The present disclosure provides a method for forming a nanomaterial or microparticle coating on a substrate such as a polymer substrate, a metal substrate, a ceramic substrate, or a glass substrate, or any combination thereof, and the resulting products comprising such a nanomaterial coating or a microparticle coating. The method can be used in large-scale manufacturing of nanomaterial or microparticle coatings.

In accordance with some embodiments, a method for forming a nanomaterial coating comprises steps of: providing a mixture comprising a solvent, a solute, and a nanomaterial or particle, wherein the solute is selected from the group consisting of a salt, a sugar, an acid, a base, and a combination thereof; applying sonication to the mixture; and contacting a substrate with the mixture so as to form a coating of the nanomaterial or the particle onto the substrate. The particles can be nanoparticles or microparticles. The nanomaterial is pre-treated, exfoliated and/or dispersed after sonication is applied. For some hydrophilic particles in water, sonication might not be necessary.

In some embodiments, the nature of the nanomaterials or particle and the substrate are opposite. For example, the nanomaterial or particle is hydrophilic while the substrate is hydrophobic, or the nanomaterial or particle is hydrophobic while the substrate is hydrophilic. In some embodiments, the nature of the nanomaterials or particle and the substrate are similar. For example, both the nanomaterial or particle and the substrate are hydrophilic or hydrophobic.

Referring to FIG. 1, an exemplary method for forming a coating on a substrate through a solute assisted assembly (SAA) process is provided. The coating can be a nanomaterial coating or a microparticle coating. The nanomaterials may be nanoparticles, nanoflakes, 2D layered nanomaterials, or nanotubes in some embodiments. The assembly system comprises four components: a type of particle, a solvent, a substrate, and a water-soluble solute. Examples of the particles include, but are not limited to nanoparticles, microparticles, nanoflakes, 2D layered nanomaterials, nanotubes, nanofibers, and any combination thereof. The solvent may be water or a water-containing solvent. Examples of the substrate include, but are not limited to a polymer, a ceramic, a metal, and a combination thereof. The water-soluble solute may be a salt, an acid, a base, a sugar, or any combination thereof. By adding a solute, the interaction between the particles and the substrate can be modulated by the solvation process of solute leading to the deposition of the particles on the substrate.

Unlike other solution-based methods using chemical treatments such as plasma, acid, or base etching, or adding surfactant to enhance the affinity between the particles and the substrate, the SAA method adds a water-soluble solute as described herein to modulate the interactions among the particles, the solvent (i.e., water) and the substrate so that the particles assembly on the substrate is energetically favorable. This schematic in FIG. 1 illustrates that the assembled particles assisted by adding a water-soluble solute such as a salt in water. To modulate the particle-particle interactions and prevent the formation of large aggregates after adding the solute such as a salt, acoustic field is applied during the salt adding process. Compared to chemical treatments that damage the chemical structure of the substrate and/or particles (e.g., breaking chemical bonds by plasma etching), the solutes available in this method do not react with the surface of particles and substrate and therefore maintain their outstanding properties.

Examples of a suitable nanomaterial or particle include, but are not limited to, a metal, an oxide, a metal hydroxide not soluble in water, a metal salt not soluble in water, a transition metal chalcogenide, a carbide, a nitride, a carbonitride, a single element material (e.g., Se, carbon based nanoparticle, nanotube, or nanofiber), a polymer, a protein, and any combination thereof. The substrate comprises a polymer, a glass sheet, a ceramic sheet, a metal foil, a paper, or any combination thereof.

The substrate is contacted with the mixture through a dip coating process, a roll-to-roll process, a mechanical stirring process, or a combination thereof. For example, a dip coating process or a roll-to-roll process is used in some embodiments.

In accordance with some embodiments, the inventors have developed a new solution-based processing method to assemble hydrophilic nanomaterials on the surface of hydrophobic substrate. Traditional assembly technologies emphasis the principle of "like assembles on like" meaning the nanomaterials must present affinity to substrates either chemically (through chemical interaction) or physically (through van der Waals interactions). In contrast, the assembly at a heterogeneous interface, i.e., between a hydrophilic nanomaterial and a hydrophobic, is extremely challenging as the solvent with affinity of one of them will easily penetrate such interface and detach the two. In the method provided in the present disclosure, a solute (such as salt, sugar, and any soluble solute in the solvent) is introduced in aqueous suspension of nanomaterials to force the assembly of hydrophilic nanomaterials on hydrophobic substrate under the agitation of acoustic field.

The salts can be any salt soluble in water, such as LiCl, NaCl, KCl, CsCl, $MgCl_2$, $CaCl_2$, $CuCl_2$, $FeCl_3$, and $Na_2SO_4$. The sugar is glucose in some embodiments. Adding solute in the solvent will alter the stability of nanomaterial suspension and force the assembly of nanomaterial on the substrate. Its universality also covers the flexibility in the choices of species of nanomaterials (e.g., $SiO_2$, ZnO, diamond, Graphene oxide, and MXene) and substrates (e.g., soft and rigid hydrophobic and hydrophilic polymer), nanomaterial size (e.g., 0.3-10,000 nm), and substrate geometry (e.g., curved substrate). When monodisperse particle (e.g., $SiO_2$) is used, monolayer assembly of particles with uniform spacing can be realized. This new method is a platform technology for achieving assembly of nanomaterials on "unlike" substrate toward the application of coatings, smart textiles, and electronics in a low-cost, environment-friendly, and controllable manner.

A new method for fabricating flexible electronics from assembly of nanomaterials on a flexible polymer substrate is provided. Flexible electronics is one of the exemplary applications for the coating described herein. The coating can be formed on rigid substrates too. Nonwetting solvents for flexible substrates and nanomaterials are used for assembly and dispersion medium. Continuous sonication is introduced into the assembly process to facilitate the assembly efficiency and uniformity. Nanomaterials from 1D like single-wall carbon nanotubes (SWNT) to 2D like graphene, h-BN and $MoS_2$ and 3D like carbon black, metal oxide, and polymer nanoparticles can be assembled into continuous films of nanoscale to microscale thickness. The lateral dimension of the assembled films ranges from micro to macro scale. Moreover, this assembly strategy also works for 3D polymer foam substrates. The assembled CNT and graphene films/foams are highly conductive and can be used in the fabrication of a wide variety of sizes of flexible electronics.

In some embodiments, the present disclosure provides an assembly method of nanomaterials on a polymer substrate. This is a simple and highly efficient assembly method for larger scale flexible electronics fabrication. This method does not require a good wetting between solvent and nanomaterials. This method does not need to add any surfactants which may cause decreased properties in some embodiments. This invention does not require a good wetting between solvent and polymer substrate. It is highly efficient and accessible for large scale flexible electronics and functional coating manufacturing.

The solute may be a salt, a sugar, an acid, a base, or a combination thereof. The solute is soluble in water or a solvent comprising water and another solvent. The solute is preferably water-soluble.

The salt may comprise a suitable metal ion and an anion resulting in a water-soluble salt. The suitable metal ions may be selected from alkali metal ions, alkali metal ions, Group 13 metal ions (such as aluminum ion), and transition metal ions. The suitable anions may be selected from halides, sulfate, nitrate, carbonate and any other anions providing a water-soluble salt. Examples of a suitable salt include, but are not limited to, LiCl, NaCl, KCl, $MgCl_2$, $AlCl_3$, $CaCl_2$, $ScCl_3$, $TiCl_4$, $MnCl_2$, $FeCl_3$, $CoCl_2$, $NiCl_2$, $CuCl_2$, $ZnCl_2$, $GaCl_3$, $GeCl_4$, $YCl_3$, $ZrCl_4$, $NbCl_5$, $MoCl_3$, $RuCl_3$, $RhCl_3$, $PbCl_2$, $CdCl_2$, $SbCl_3$, CsCl, $BaCl_2$, $LaCl_3$, $HfCl_4$, $WCl_6$, $ReCl_3$, $OsCl_3$, $AuCl_3$, $BiCl_3$, NaF, NaBr, NaI, $Na_2CO_3$, $NaNO_3$, $Na_2SO_4$, and any combination thereof. In some embodiments, the salt is a halide, a sulfate, a nitrate, or a carbonate of an alkali metal or alkali earth metal.

The sugar may be a monosaccharide or a disaccharide. The monosaccharide may be selected from glucose, fructose, galactose, and any combination thereof. The disaccharide may be selected from sucrose, lactose, maltose, and any combination thereof. The sugar is glucose in some embodiments.

Examples of a suitable acid include, but are not limited to, acetic acid. Examples of a suitable base include, but are not limited to, potassium hydroxide, sodium hydroxide, and a combination thereof.

The nanomaterial or particles to be coated onto a substrate may be nanomaterials, nanoparticles, and microparticles, which may be a metal, an oxide, metal hydroxide not soluble in water, a salt, transition metal chalcogenides, a carbide, a nitride, or a carbonitride. Examples of a suitable metal include, but are not limited to, silver, gold, and chromium nanoparticle, and copper nanowire. Examples of a suitable oxide include, but are not limited to, $SiO_2$, graphene oxide, ZnO, $ZrO_2$, $Y_2O_3$, $TiO_2$, $MnO_2$, $Al_2O_3$, $Fe_2O_3$, $MoO_3$, $WO_3$, $In_2O_3$, $SnO_2$ and any combination thereof. Metal hydroxides not soluble in water such as $Al(OH)_3$ and $Mg(OH)_2$ can be used. Metal salt not soluble in water such as AgCl, CuI, $CaTiO_3$, and $BaTiO_3$ can be used.

The nanomaterial may be 0D quantum dots, 1D nanostructures, 2D layered nanostructures or nanosheets, 3D nanoparticles, or a combination thereof. The 1D nanostructures are selected from carbon nanotubes, carbon fibers, nanowires, and a combination thereof.

In some embodiments, the nanomaterial comprises a layered nanostructure or nanosheet, including but not limited to, MXene, graphene, h-BN, $MoS_2$, or a combination thereof. The nanomaterial is exfoliated and dispersed after sonication is applied. In some embodiments, the nanomaterial comprises carbon nanotube (CNT), including but not limited to single wall, dual wall, and multi-wall CNTs. In some embodiments, the nanomaterial comprises carbon black, hydrophobic silicon dioxide, metal oxide nanoparticles, or a combination thereof. In some embodiments, the nanomaterial comprises polymer nanoparticles.

Examples of a suitable transition metal chalcogenides include, but are not limited to: $SnS_2$ and $MoS_2$. Examples of a suitable carbide or nitride include, but are not limited to: $Si_3N_4$, BN, TiC, MXene (e.g., $Ti_3C_2T_x$). Examples of a suitable single elements particles include, but are not limited to: Se, carbon black, graphene, MWCNT, SWCNT, diamond, and graphite nanofiber. Polymer particles such as polymethyl methacrylate, polystyrene, polytetrafluoroethylene, and suitable proteins such as collagen can be also used.

The substrate can be any suitable material. Examples of a suitable substrate include, but are not limited to, polydimethylsiloxane (PDMS), fluorosilicone, polypropylene polyethylene (PP), polyethylene (PE), polyimide (PI), polyetherimide (PEI), polyvinylidene fluoride (PVDF), thermoplastic polyurethane (PU), polymethyl methacrylate (PMMA), polyethylene terephthalate (PET), polytetrafluoroethylene (PTFE), polyvinyl chloride (PVC), polyamide such as nylon (e.g., nylon 6), polyetherether ketone (PEEK), acrylonitrile butadiene styrene polymer (ABS), polybenzimidazole (PBI), polycarbonate (PC), polyoxymethylene (POM), epoxy, polyethersulfone (PES), glass slide, copper foil, molybdenum foil, aluminum foil, papers, or any combination thereof. The substrate such as polymer substrate can be a film, a fabric, a sheet, or a three-dimensional object. The PE films can be high density polyethylene (HDPE) film or ultra-high molecular weight (UHMW) film. PP nonwoven or fabric, PET fabric, or Kevlar fabric can be also used. The film thickness of such a film, a fabric or nonwoven substrate may have a thickness in a range of from 0.1 mm to 0.5 mm.

The present disclosure also provides a novel dip coating method superior to any existing dip coating method.

In some embodiments, the nanomaterials and proper solvent are mixed together and sonication is introduced for nanomaterials dispersion and exfoliation. A polymer substrate is then immersed into the solution for assembly. The resulting assembled samples are carefully rinsed in a clean solvent and dried.

In accordance with some embodiments, the solvent chosen for exfoliation and assembly does not necessarily have to be a favored solvent for substrate wetting or for the nanomaterials exfoliation.

In some embodiments, DI water, which is a non-toxic but poor wetting solvent for polydimethylsilicone (PDMS), is used to exfoliate and/or disperse and then assemble 1D carbon nanotube and different 2D nanomaterials (graphene, h-BN and $MoS_2$) on a PDMS substrate. A uniform film can be formed in as short as 10 seconds after dipping the PDMS substrate in the mixture of water and nanomaterials and by adjusting the solution concentration and assembly time, the thickness of assembled film can be easily tuned from several nanometers to several tens of micrometers.

The present disclosure provides a high rate, cost-efficient and environment-friendly manufacturing method for making nanomaterial films for flexible electronics. This method in the present disclosure can achieve assembly in a solvent such as a water solution, in a short period and with high controllability.

In some embodiments, the substrate comprises or is made of a polymer. The substrate is made of a hydrophobic polymer such as silicone, fluorosilicone, hydrocarbon fluoropolymer, thermoplastic polyurethane (TPU), or a combination thereof. The TPU has corresponding structures rendering it hydrophobic. For example, TEXIN® 1209 resin, which is an aromatic polyether-based thermoplastic polyurethane, can be used.

In some embodiments, dispersion of nanomaterials may not be desired in the non-wetting solvents, especially for bulk layered nanomaterials. The exfoliation efficiency is low in bad and surfactant free solvents. This limitation can be overcome by two-step assembly process. The first step is getting a well-exfoliated nanomaterial in any good solvents system. The second step is transferring the exfoliated nanomaterial to non-wetting solvent and then do the assembly.

In some embodiments, the solvent is water. In some other embodiments, the solvent may be aqueous while containing a small amount of ions. The pH value of the solvent may be in a suitable range, for example, from 6 to 8.5 in some embodiments. For electronic application, deionized water is preferred for high purity of the resulting coating.

In some embodiments, no surfactant or other additives are added in the mixture. The mixture may consist of water and hydrophobic nanomaterials or particles.

In some embodiments, the sonication is applied with an energy in a range of from 0.01 watt/cm$^2$ to 10 watts/cm$^2$. A sonication at low energy is preferred in some embodiments. The frequency may be in in a range of from 20 kHz to 10 MHz, for example, in a range of from 20 KHz to 1 MHz.

The method is a fast dip coating process, and can be performed much faster than any existing dip coating method. For example, the pre-determined speed is 1 meter/minute or higher. The pre-determined speed can be in a range of from 1 meter/minute to 600 meter/minute (e.g., 1-100 m/min., 1-50 m/min., 10-100 m/min., 5-50 m/min., or any suitable range). The coating method provided in the present disclosure is a break-through technology in the coating field, particularly in dip-coating field.

The substrate may have a flat surface for coating, or have a 3D configuration for coating. The surface roughness may not be critical. So a smooth or rough surface can be good for coating nanomaterials using the method provided in the present disclosure. The substrate may be dipped into the mixture and pulled out from the mixture at any suitable angle. The coating process is self-limiting and will reach an equilibrium status after a certain period of time such that the thickness of the film will not increase with the increase of assembly time.

The method is performed at a processing temperature in a range from a freezing point to the boiling point of the solvent used. In some embodiments, the dipping step for coating is performed at a temperature in a range of from 20° C. to 100° C. (e.g., RT to 50° C.).

In some embodiments, the solvent is water and the substrate includes a polymer such as silicone, fluorosilicone, hydrocarbon fluoropolymer, and thermoplastic polyurethane (TPU), or any combination thereof. The nanomaterial can be any material as described above.

In another aspect, the present disclosure provides an article or any product comprising the resulting nanomaterial coating formed by the methods described above. An article or product comprises a substrate and a nanomaterial coating deposited on the substrate.

The resulting product comprises a nanomaterial coating disposed on the substrate. In some embodiments, the coating comprises a two-dimensional layered nanomaterial assembly structure. The nanomaterial is oriented parallel to the surface of the substrate. In some embodiments, the substrate may include pores or three-dimensional structures so that the resulting coating also has the three-dimensional structures. The nanomaterial may interpenetrate into the pores. In some embodiments, the substrate may be smooth or has a certain surface roughness.

The nanomaterial or particle may have a suitable size, for example, in a range of from about 1 nm to about 10 microns. For example, the nanomaterial or particle comprises nanomaterials having at least one dimension in a range of from about 1 nm to about 1,000 nm, for example, from about 10 nm to about 1,000 nm. In some embodiments, the nanomaterial or particle comprises microparticles having a diameter in a range of from about 1 micron to about 10 microns. In some embodiments, the coating comprises layered nanomaterials, and the layered nanomaterials have a size of spacing, which is controlled by species of the solute.

In some embodiments, the solvent is water or comprises water and another solvent. The mixture contains no surfactant.

The nanomaterial coating may have a thickness from 1 nanometer to 100 microns, for example, from 1 nanometer to 10 microns or from 5 nanometers to 10 microns, in some embodiments. The coating may have good adhesion on the substrate and cannot be rubbed off.

The present disclosure also provides a resulting article, comprising a substrate and a coating disposed on the substrate and comprising a nanomaterial or particle, formed using the method as described herein. The resulting article product comprising the assembled nanomaterial coating and the substrate, such as a polymer substrate, can be utilized to make flexible electronics.

The resulting product can be used to make devices such as flexible electronics such as sensors, transistors, electrode and any other suitable components, which may be used for device manufacturing, diagnostic, and research tools.

In some embodiments, the article may further comprise a conductive layer disposed on the nanomaterial coating. The conductive layer comprises a metal, a carbide, a nitride, a carbonitride, or any combination thereof. The nanomaterial coating is a monolayer, and the conductive layer has a thickness at nanometer level.

Solute-Assisted Assembly Process

The general conditions and parameters are described herein for illustration purpose only.

A particle aqueous solution and a solute solution (or pure solute) with certain concentrations were prepared respectively, and both solutions are mixed together under sonication. In this way, a solute-particle solution was fabricated. The term "particle solution" may be understood as a suspension of particles. The concentrations of the resultant solute and particle solution were determined, respectively. Because the aggregation would occur when mixing solute and particle solution, the solute-particle solution was then sonicated with stirring for 30 minutes to achieve proper dispersing. A lab-made dip coater was then used to realize the dip-coating assembly process on various substrates. In the experiments described herein, the substrates were immersed in the solution during the whole assembly process. The assembled nanomaterial or particles on respective substrates were dried by nitrogen gas to remove excess solute-particle solution. The resultant sample was further rinsed by DI water to remove excessive solute deposited on the surface of nanomaterials and dried using nitrogen gas. A small amount of solute will remain on the surface of nanomaterials or particles, and cannot be removed by the rinsing process.

1. Processing Conditions: three ways and combinations thereof were tried to agitate the solution to enhance the nanomaterials/particles dispersion and energize the particles to speed up the assembly process: (a) Sonication; (b) dip coating; (c) roll-to-roll process, mechanical stir, and any combination of these processes including (a), (b), and/or (c). In most of the experiments described herein, dip coating plus sonication assembly method was used. Stirring can be used for the assembly of some materials. The sonication with a frequency of 40 Khz and an intensity of <10 mW/cm$^2$ was used. However, any other frequency in the range of from 20 kHZ to 100 MHz can be used. The sonication intensity may be in a range of from 10 mW/cm$^2$ to $4 \times 10^4$ W/cm$^2$. The dip coating speed may be 1 meter/second.

2. Substrate species and direction: One exemplary substrate used in the experiments was polydimethylsiloxane (PDMS) substrate. In the PDMS substrate, the ratio of DMS monomer and cross-linking agent was 10:1. Such a ratio can be adjusted in a range from 60:1 to 2:1, which also works for the assembly process. Other suitable substrates as described above such as polymers including, but not limited to PP, HDPE, UHMWPE, PVDF, PET, PEEK, ABS, PC, epoxy, PES, PA-6, PI, PBI; metals; glass, ceramics have been validated to work as well.

3. Period of time for coating: The assembly time was 15 min in the experiments for the data presented herein. The period of time for coating can be adjusted according to different particles and substrates. The coating time or the assembly time can be in a range from several seconds to several hours.

4. Temperature of solution in sonicator: The assembly process can be performed at any suitable temperature, for example, from freezing temperature (0° C.) to an increased temperature (99° C.). The experiments described herein were performed at 50° C. during sonication. When sonication is on, the solution will be heated up.

5. Solvent: Any suitable solvent such as deionized water or other organic solvent (e.g., acetone, alcohol) can be used. In the experiments described herein, deionized water was used. The solvent should not dissolve substrate or damage the required structural and mechanical integrity of the substrates unless such requirement is compromised by a specific application. For example, for applications requiring structural/mechanical integrity of the substrate such as electronics and safety textiles, the solvent should not dissolve or even swell the substrate. However, some applications, e.g., sensing application, may require swell the substrate to embed particles into the surface, the solvents that can swell the substrate can be used. In all cases, the solvent and the solute added may modify the surface properties of particle and substrate, such modification is allowed.

6. Solute species: The solute used in the method provided in the present disclosure include a salt (e.g., NaCl, KCl, or a combination thereof), sugar (e.g., glucose), an acid (e.g., acetic acid), a base (e.g., KOH), or a combination thereof. A hybrid solute such as mixtures of multiple salts or a combination including any combination of salt, sugar, acid or base can be also used. For a hybrid solute, the individual solutes should not react to each other. For example, an acid and a base are not used in a hybrid solute. A salt can be used together with an acid or a base. For the selection criterion, the solute can be dissolved in the solvent (e.g., deionized water). Meanwhile, the formed solution should not dissolve the substrate or damage the required structural and mechanical integrity of the substrates. In addition, surface modification is allowed for both particles and substrates.

7. Solute concentration: the concentration of the solute in the solution can be in a range of from 0.000001% by weight or 0.001 mol/L to a saturated concentration at room temperature in the corresponding solvent such as deionized water. The saturation concentration can be increased by increasing the temperature. Each solute has its specific saturated concentration at different temperatures.

8. Concentration of nanomaterial or particle: the nanomaterials or particles may have any suitable concentration in the solution, for example, 0.01-500 mg/mL, 0.1-100 mg/mL, 0.5-50 mg/mL, or 0.5-20 mg/mL. In some embodiments, a concentration in a range of 0.1-100 mg/mL was used. The nanomaterials or particles are insoluble in the solvent or have negligible solubility in the solvent. In some embodiments, this particle concentration may be lower or higher than 10 mg/mL due to the properties of various particles.

9. Particle size: the particles used may have a size ranging from several nanometers to tens of micrometers.

10. The pH value of the solution: The solution can be neutral, acidic or basic. The pH value of solution can be adjusted in consideration of the particles and the substrate.

11. Nanomaterial/particle species: The nanomaterials (the particles) can be of any suitable type. For example, these may include oxides, single element particles, transition metal chalcogenides, transition metal carbides and nitrides, and polymer particles.

Examples

The examples are described herein for illustration purpose only. A general experimental procedure is described using MXene as an exemplary nanomaterial or particle to be coated. Silicone was used as a hydrophobic polymer substrate.

A MXene colloidal solution was diluted by adding prepared salt solution. In this way, salt-MXene solution was fabricated, where the resultant salt concentration and MXene solution are 0.01 mol/L and 10 mg/mL, respectively. Because the aggregation will occur when mixing salt and MXene solution, forming gel-like MXene, of which the high viscosity makes the later assembly process unreachable, the salt-MXene solution was then sonicated with stirring for 30 minutes for the aim of dispersing. A lab-made dip coater was used to realize the dip-coating assembly process on various substrates. The substrates were immersed in the solution during the whole assembly process. The assembled MXenes on substrates were dried by nitrogen gas to remove excess salt-MXene solution. The salt crystals remained in the MXene assemblies were rinsed off by DI water following nitrogen gas drying. In this general procedure, MXene can be replaced with any other nanomaterials or particles as described herein. The concentrations can be also adjusted.

The silicone substrate used in the present disclosure is polydimethylsiloxane (PDMS, monomer: curing agent=10:1). $Ti_3C_2T_x$ used herein is one exemplary MXene, and is titanium carbide ($Ti_3C_2$) having 2D layered structures. MXene used had an average monolayer thickness and lateral size of 1.8 nm and 676.8 nm, and was obtained from Dr. Yury Gogotsi's group at Drexel University of Pennsylvania, USA.

In accordance with some embodiments, the substrate is in the solution while the solution is under sonication during the assembly.

To demonstrate the effectiveness of solution assisted assembly, a hydrophilic materials, $Ti_3C_2T_x$ (a type of MXene), and a hydrophobic substrate, PDMS, are chosen to assembly in water. A solution comprising MXene ($Ti_3C_2T_x$) was obtained by an etching method using a mixture of LiF and HCl. The concentration of MXene solution was 10 mg/mL. A type of salt, NaCl, was added to $Ti_3C_2T_x$/water solution (the molar concentration of NaCl in the mixed solution is 0.01 mol/L) and acoustic field (40 KHz, 60 W) is applied during the mixing process to prevent the formation of large aggregation of $Ti_3C_2T_x$. After mixing of salt and solution, PDMS substrate is submerged into the NaCl/$Ti_3C_2T_x$/water solution. After 15 minutes, the PDMS substrate with MXenes assembled is obtained after washing with deionized water and drying using $N_2$ gas.

Figure 2:
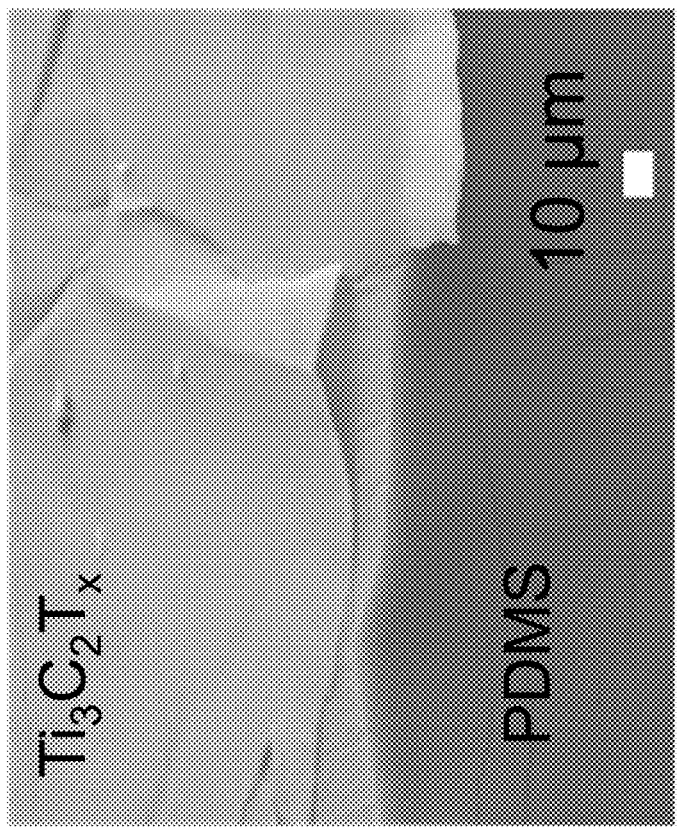
FIG. 2 shows SEM images of the top surface (A) and tilted angle view (B) of fractured cross section of one exemplary MXene, $Ti_3C_2T_x$, assembled on polydimethylsiloxane (PDMS) substrate assisted by NaCl as an exemplary salt in accordance with some embodiments.
Figure 2:
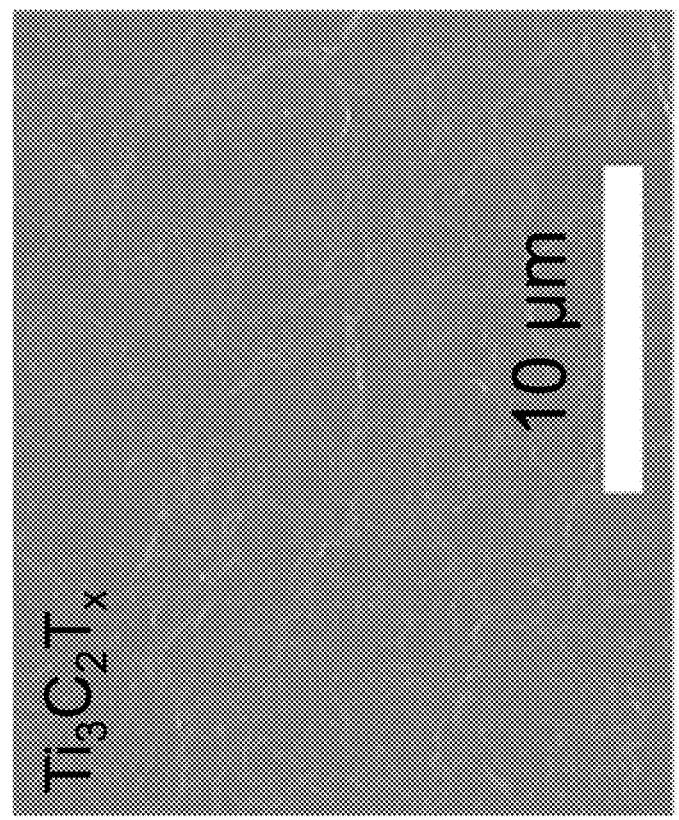

FIG. 2 shows the top surface (A) and tilted angle view (B) of fractured cross section of $Ti_3C_2T_x$ assembled on PDMS substrate assisted by NaCl. The resultant scanning electron microscope (SEM) images of top view and the fractured cross section show success assembly. Four-point probe electrical measurement of resultant sample shows the electrical conductivity of $Ti_3C_2T_x$ assemblies (20000 S/cm) approaches the highest reported values for $Ti_3C_2T_x$ (up to 25000 S/cm). The electrical conductivity of $Ti_3C_2T_x$ assemblies here (20000 S/cm) is one of the highest values (up to 25000 S/cm according to the reference) reported yet. This electrical measurement results suggest a suitable salt will not significantly damage the properties of particles.

Figure 3:
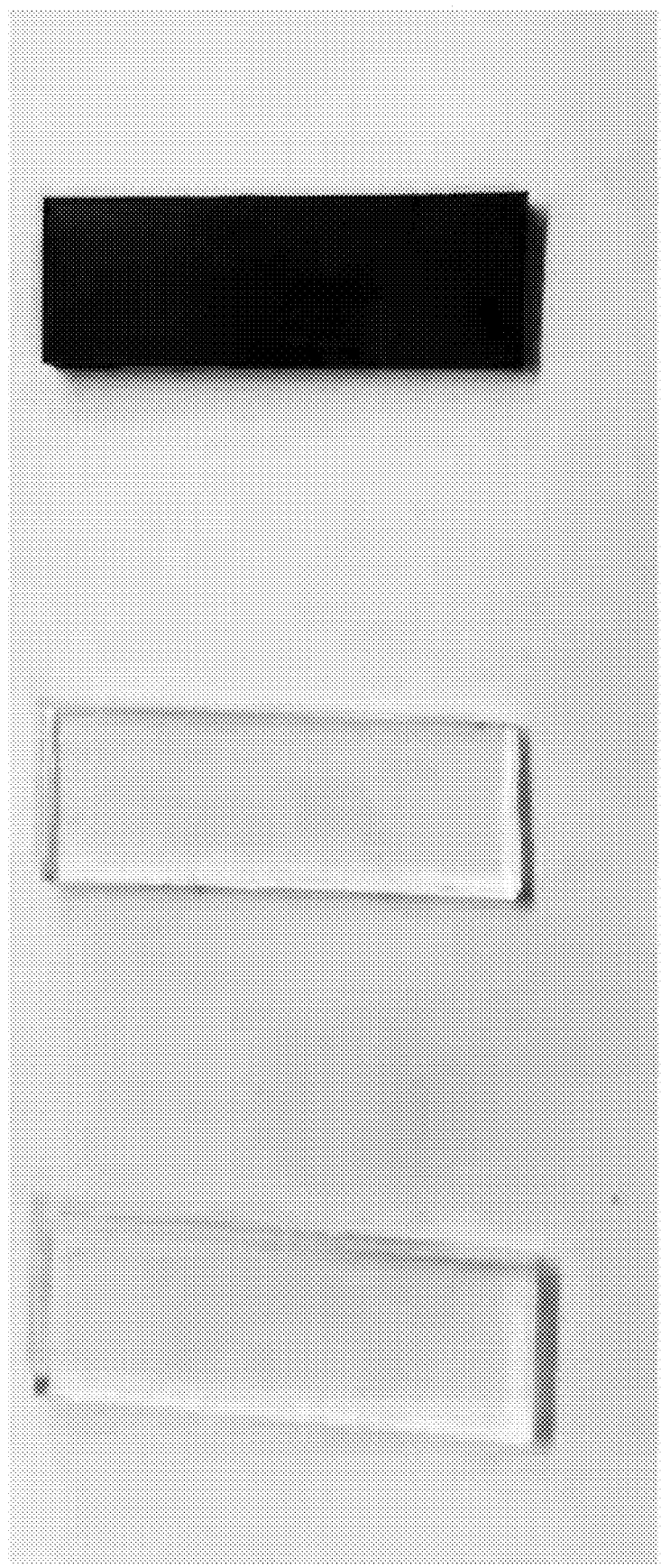
FIG. 3 shows digital images of bare PDMS substrate and $Ti_3C_2T_x$ assembly on PDMS with and without NaCl.

To illustrate the effectiveness of solute assisted assembly method, a compare experiment is designed to assemble $Ti_3C_2T_x$ with and without adding NaCl in water. FIG. 3 shows digital images of bare PDMS substrate and $Ti_3C_2T_x$ assembly on PDMS with and without NaCl.

Hydrophilic $Ti_3C_2T_x$ cannot be assembled on hydrophobic polymer substrates without adding a solute such as NaCl, but the assembly can occur when adding NaCl. The concentrations of $Ti_3C_2T_x$ and NaCl are 5 mg/mL and 0.01 mol/L, respectively.

Figure 4:
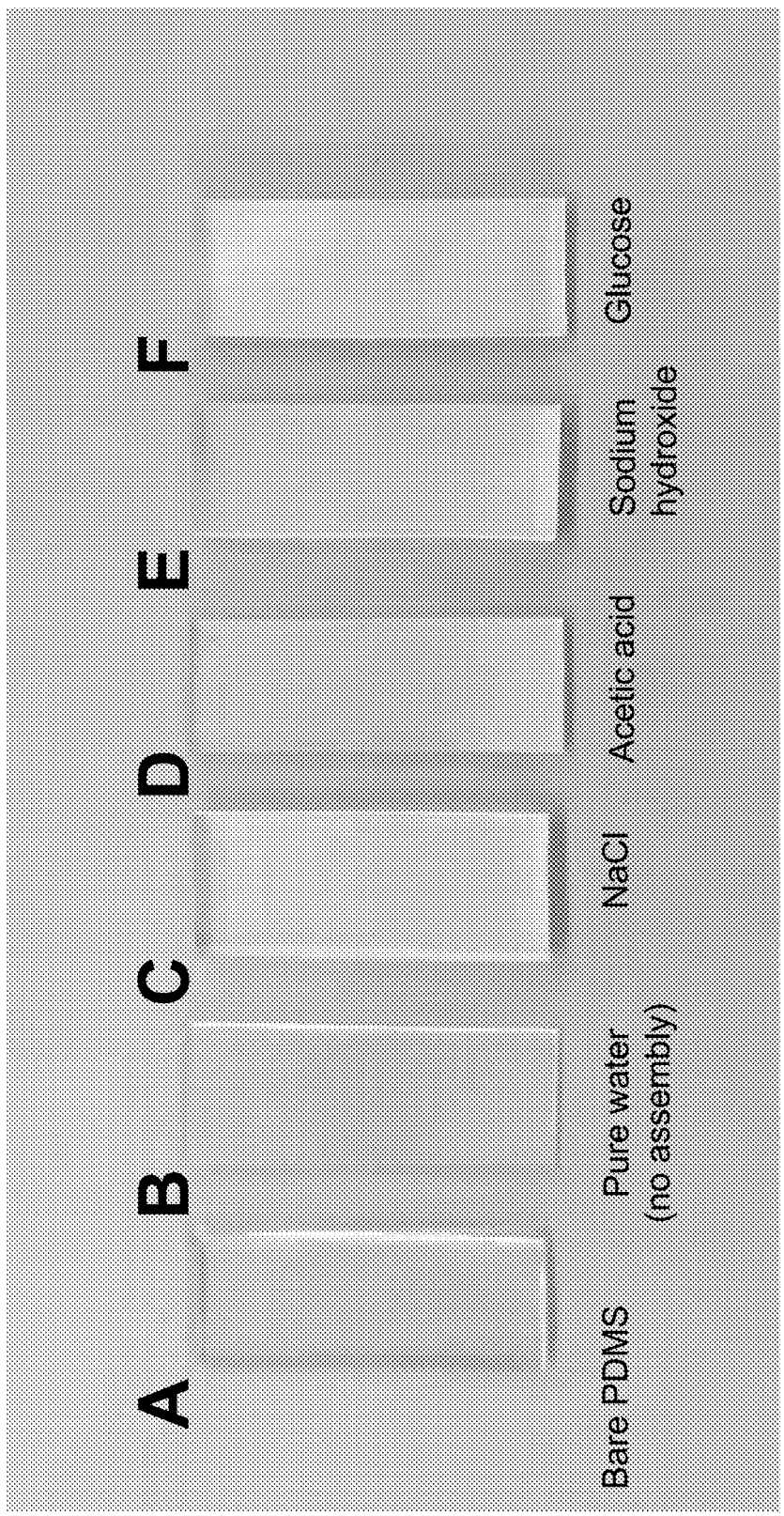
FIG. 4 shows digital images of bare PDMS substrate (A), $SiO_2$ nanoparticle assemblies on PDMS in pure water (B), in NaCl water solution (C), in acetic acid water solution (D), sodium hydroxide water solution (E), and glucose water solution (F), in accordance with some embodiments.

Referring to FIG. 4, a solution comprising $SiO_2$ particles was made by mixing the deionized water and $SiO_2$ particles. The concentration of particle solution was 10 mg/mL. Then NaCl salt was slowly added into the resulted particle solution with sonication (NaCl concentration: 1 mol/mL). A piece of PDMS coated glass slide was carried by the dip coater. The assembly occurred with sonication on and PDMS substrate dipping in the solution. After 15 minutes, the PDMS substrate with $SiO_2$ particles assembled was obtained after steps of washing with deionized water and drying using $N_2$ gas.

Similar experiments using $SiO_2$ nanoparticle solution on PDMS in pure water, in NaCl water solution, in acetic acid water solution, sodium hydroxide water solution, and glucose water solution were performed. The acetic acid concentration in water is 10 vol. %. The sodium hydroxide and glucose concentrations are 1 mg/mL and 5 mg/mL, respectively. The $SiO_2$ nanoparticles have a size range of 20-30 nm in diameter, and were obtained from US Research Nanomaterials, Inc. of Texas, USA.

FIG. 4 shows digital images of bare PDMS substrate (A), $SiO_2$ nanoparticle assembly on PDMS in pure water (B), in NaCl water solution (C), in acetic acid water solution (D), sodium hydroxide water solution (E), and glucose water solution (F), respectively. Uncoated PDMS is transparent. The samples coated with $SiO_2$ nanoparticles are not transparent.

The results demonstrate that salt can induce the assembly of nanoparticles. But with pure water without the salt, the assembly does not happen. Also, the effectiveness of other solutes (e.g., acid, base, and sugar) in assisting the assembly of $SiO_2$ nanoparticles on PDMS substrate in water has been demonstrated.

Figure 5:
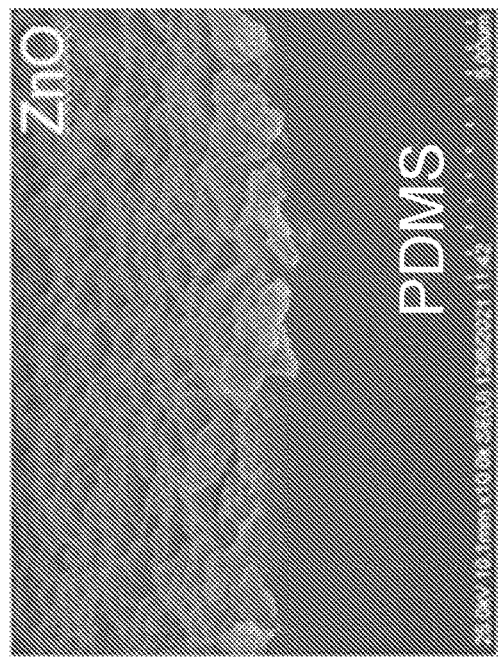
FIG. 5 shows tilted-angle SEM images of cross section view of assembled oxides particles on PDMS assisted by salt such as NaCl: (A) Zirconium oxide ($ZrO_2$), (B) Zinc oxide (ZnO), (C) Ferric oxide ($Fe_2O_3$), and (D) Manganese (IV) oxide ($MnO_2$), in accordance with some embodiments.
Figure 5:
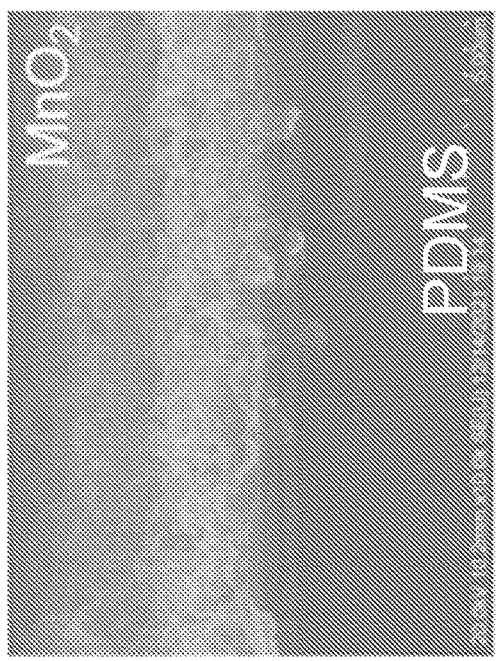
Figure 5:
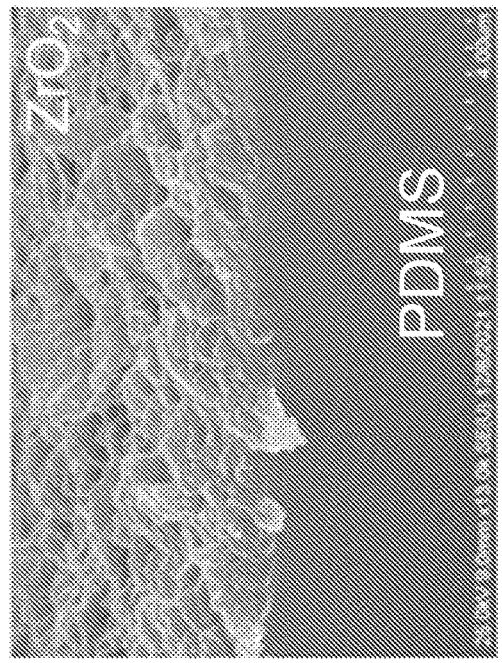
Figure 5:
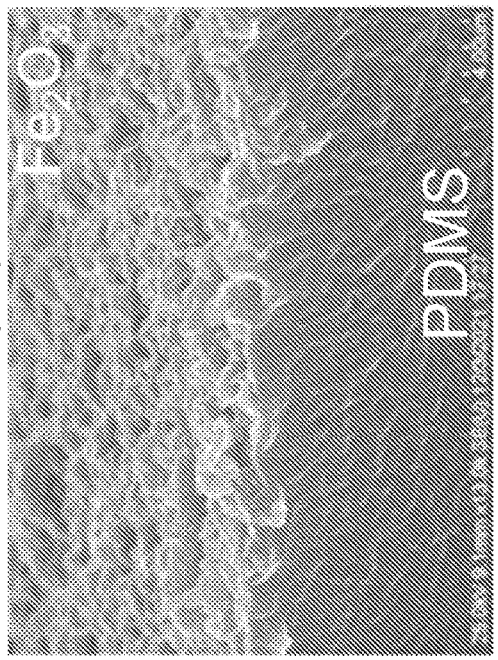
Figure 6:
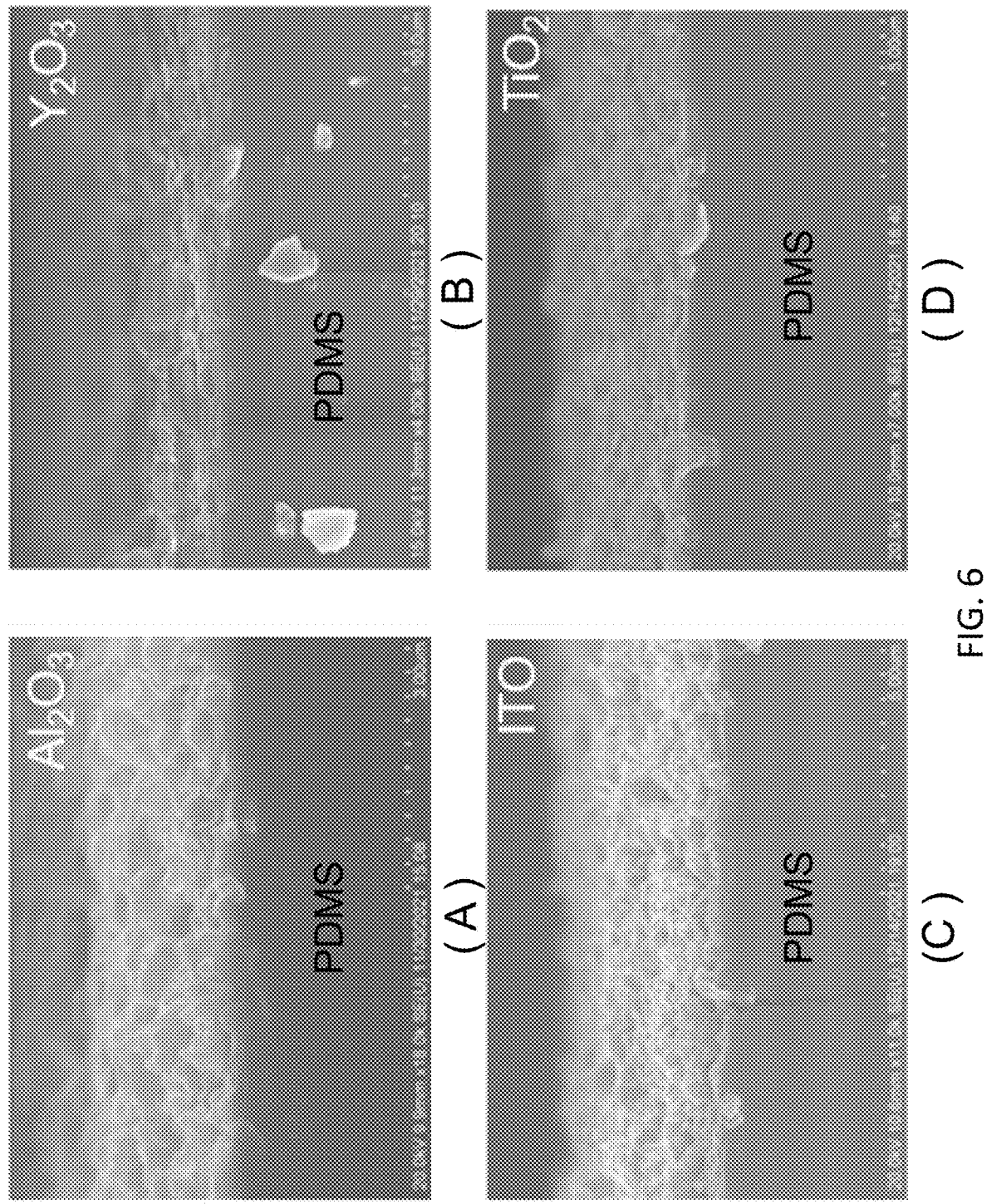
FIG. 6 shows tilted-angle SEM images of cross section view of assembled oxides particles on PDMS assisted by salt such as NaCl: (A) Aluminum oxide ($Al_2O_3$), (B) Yttrium oxide ($Y_2O_3$), (C) Indium tin oxide (ITO), and (D) Titanium oxide ($TiO_2$), in accordance with some embodiments.

The SAA method can be generalized to a wide range of material systems including particles, substrate, and solute added. For particles, as an example, a collection of oxide particles can be assembled on a PDMS substrate, as shown in FIGS. 5-6. NaCl was used as an exemplary salt. The concentration of NaCl in the final solution was 1 mol/L and the particle concentrations of different particles was 5 mg/mL.

FIG. 5 shows assembled exemplary oxides particles on PDMS assisted by salt: (A) $ZrO_2$, (B) ZnO, (C) $Fe_2O_3$, and (D) $MnO_2$. FIG. 6 shows assembled oxides particles on PDMS assisted by salt such as NaCl: (A) $Al_2O_3$, (B) $Y_2O_3$, (C) indium tin oxide (ITO), and (D) $TiO_2$. Indium tin oxide may have a formula $In_2O_3$:$SnO_2$. The $ZrO_2$ nanoparticles have a size range of 20-30 nm, and were obtained from SkySpring Nanomaterials, Inc. of Texas, USA. The ZnO nanoparticles have a size range of 10-30 nm, and were obtained from US Research Nanomaterials, Inc. of Texas, USA. The $Fe_2O_3$ nanoparticles have an average size of 30 nm, and were obtained from US Research Nanomaterials, Inc. of Texas, USA. The $MnO_2$ nanoparticles have an average size of 50 nm, and were obtained from US Research Nanomaterials, Inc. of Texas, USA. The $Al_2O_3$ nanoparticles have an average size of 80 nm, and were obtained from US Research Nanomaterials, Inc. of Texas, USA. The $Y_2O_3$ microparticles have an average size of 80 nm, and were obtained from US Research Nanomaterials, Inc. of Texas, USA. The ITO nanoparticles ($In_2O_3$:$SnO_2$=90:10 in weight ratio) have a size range of 20-70 nm, and were obtained from US Research Nanomaterials, Inc. of Texas, USA. The $TiO_2$ nanoparticles have a size range of 10-30 nm, and were obtained from SkySpring Nanomaterials, Inc. of Texas, USA.

In addition to the oxides as shown in FIGS. 4-6, other particles may be selected from $MoO_3$, $WO_3$, and any combination from any suitable oxides.

Figure 7:
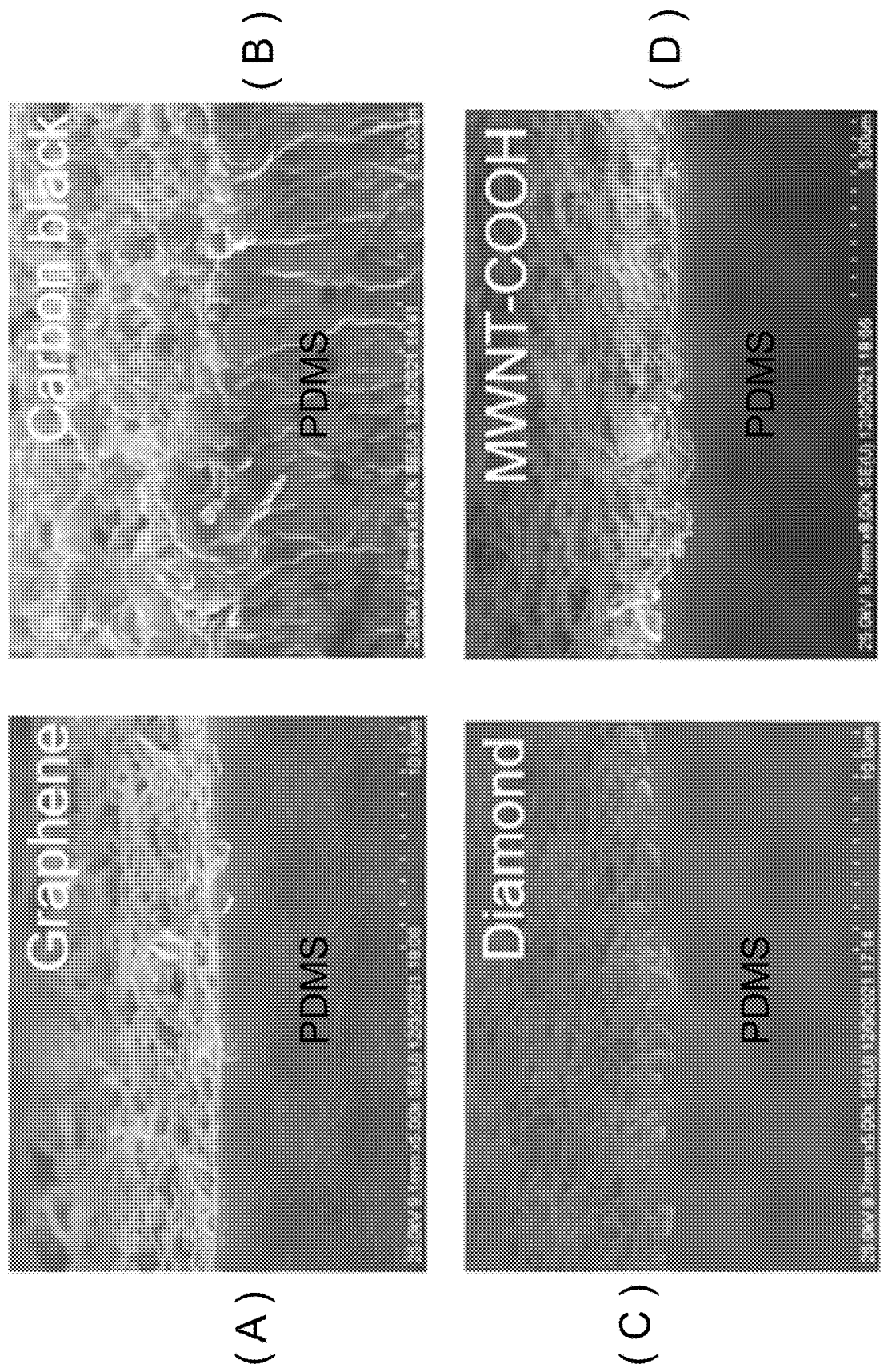
FIG. 7 shows tilted-angle SEM images of cross section view of assembled single element particles on PDMS assisted by NaCl as an exemplary salt: (A) Graphene, (B) Carbon black, (C) Diamond, and (D) carboxyl modified multi-wall carbon nanotube (MWNT-COOH), in accordance with some embodiments.
Figure 8:
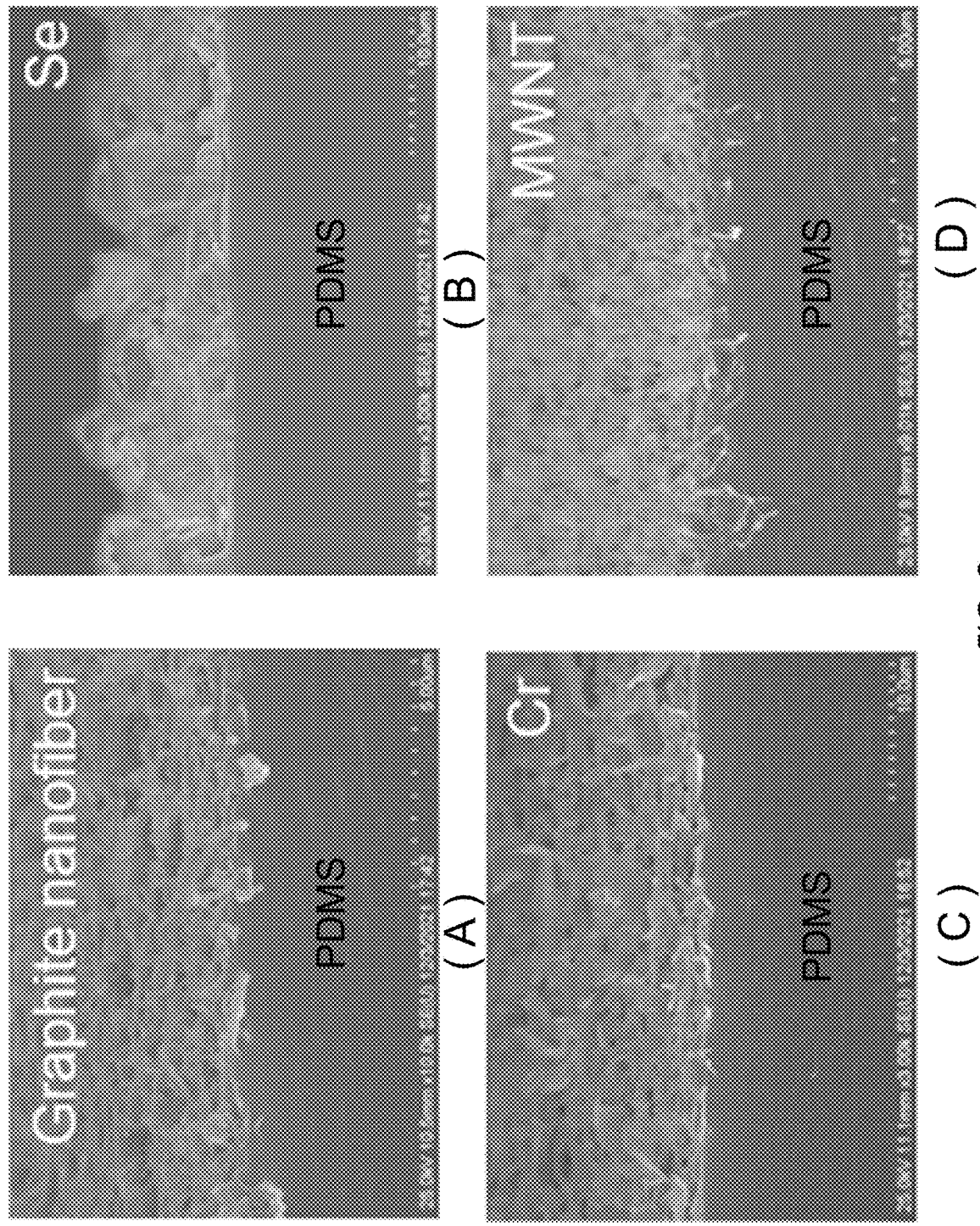
FIG. 8 shows tilted-angle SEM images of cross section view of assembled single element particles on PDMS assisted by NaCl as an exemplary salt: (A) Graphite nanofiber (GNF), (B) Selenium (Se), (C) Chromium (Cr), and (D) MWNT, in accordance with some embodiments.
Figure 9:
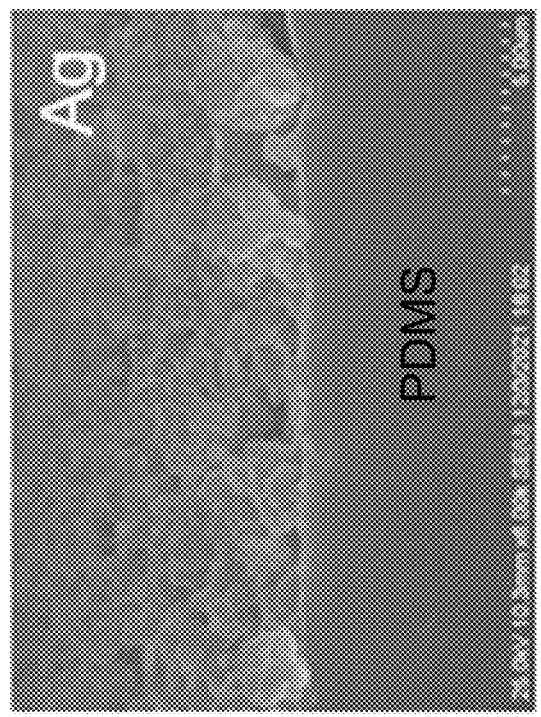
FIG. 9 shows tilted-angle SEM images of cross section view of assembled single element particles on PDMS assisted by NaCl as an exemplary salt: (A) Silver (Ag), and (B) Ribbon graphite nanofiber, in accordance with some embodiments.
Figure 9:
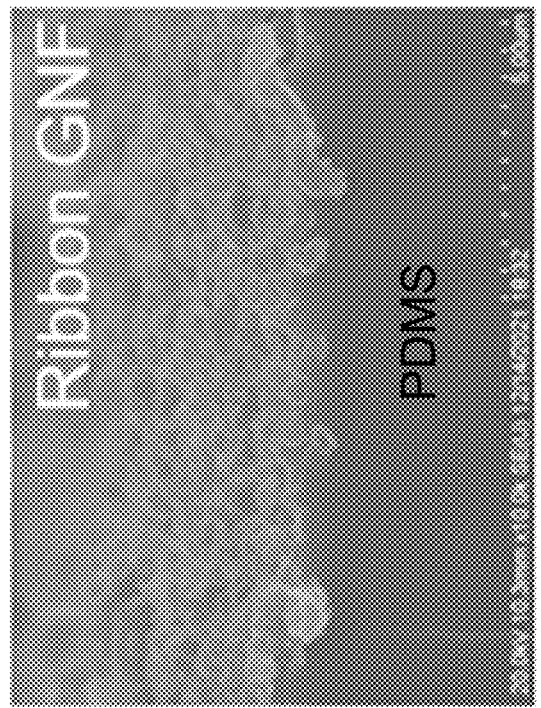

FIGS. 7-9 demonstrate that various single element particles can be assembled on hydrophobic substrates assisted by salt. NaCl was used an exemplary salt. The concentration of NaCl in the final solution was 1 mol/L and the particle concentrations of different particles were 5 mg/mL. FIG. 7 shows SEM images of assembled single element particles on PDMS assisted by NaCl: (A) Graphene, (B) Carbon black, (C) Diamond, and (D) carboxyl modified multi-wall carbon nanotube (MWNT-COOH). FIG. 8 shows SEM images of assembled single element particles on PDMS assisted by NaCl: (A) Graphite nanofiber, (B) Se, (C) Cr, and (D) MWNT. FIG. 9 shows SEM images of assembled single element particles on PDMS assisted by NaCl: (A) Ag, and (B) Ribbon graphite nanofiber. These particles include, but are not limited to, graphene, carbon black (CB), diamond, multi-walled carbon nanotube (MWNT), multi-walled carbon nanotube terminated with —COOH group (MWNT-COOH), graphite nanofiber (GNF), selenium (Se), silver (Ag), and chromium (Cr), and any metal powder. The single elements may be chemically modified. For example, carbon nanotubes (CNT) can be modified with —COOH groups. The graphene nanoparticles have an average size of 500 nm, and were obtained from XG Sciences, Inc. of Michigan, USA. The carbon black nanoparticles have an average size of lower than 50 nm, and were obtained from SkySpring Nanomaterials, Inc. of Texas, USA. The diamond particles have an average size of 1 μm, and were obtained from Sigma-Aldrich, Inc. of Missouri, USA. The MWNT-COOH nanoparticles have a size range of 10-20 nm in diameter, and were obtained from SkySpring Nanomaterials, Inc. of Texas, USA. The graphite nanofibers have a diameter and length range of 200-600 nm and 20-50 μm, and were obtained from US Research Nanomaterials, Inc. of Texas, USA. The Cr particles have an average size of 1 μm. The MWNT nanoparticles have a size range of 10-20 nm in diameter, and were obtained from SkySpring Nanomaterials, Inc. of Texas, USA. The Se particles have an average size of 200 mesh, and were obtained from Sigma-Aldrich, Inc. of Missouri, USA. The Ag nanoparticles have an average size of 100 nm, and were obtained from SkySpring Nanomaterials, Inc. of Texas, USA. The ribbon graphite nanofibers have an average length of 20-50 μm.

Figure 10:
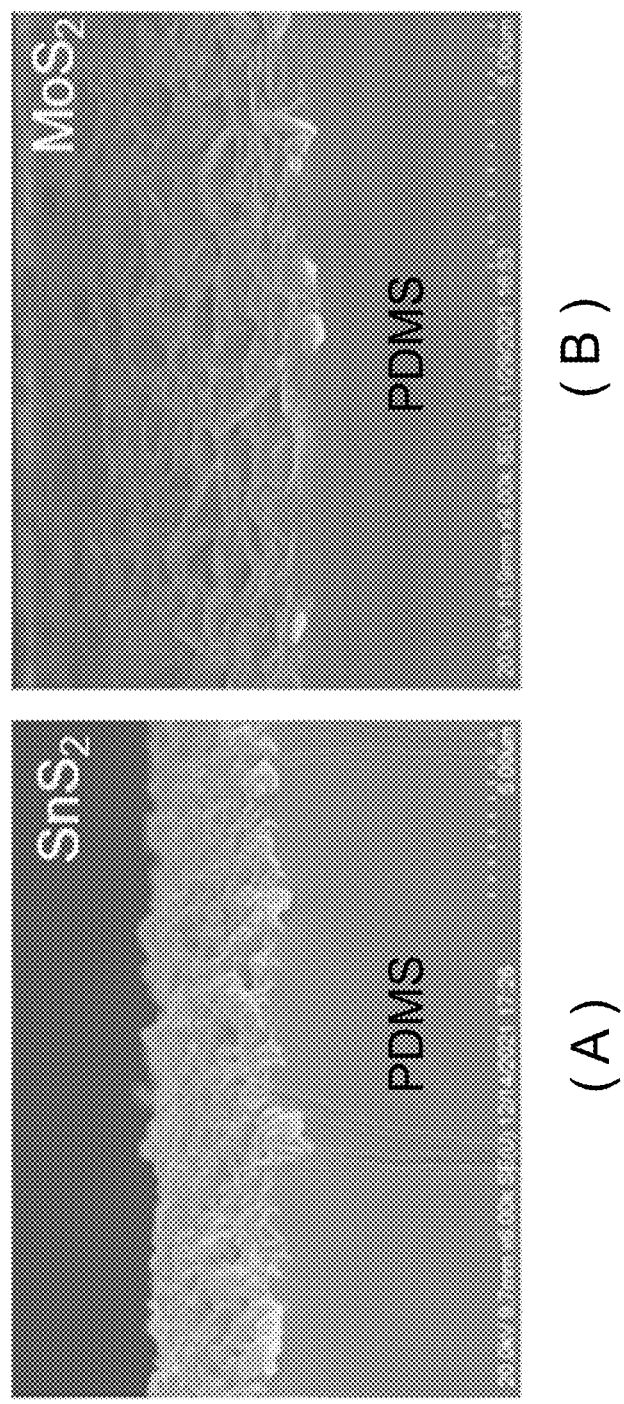
FIG. 10 shows tilted-angle SEM images of cross section view of various transitional metal dichalcogenide particles assembled on PDMS assisted by NaCl as an exemplary salt: (A) Stannic sulfide ($SnS_2$), and (B) Molybdenum sulfide ($MoS_2$), in accordance with some embodiments.

FIG. 10 shows assembled transitional metal dichalcogenide particles on PDMS assisted by NaCl: (A) $SnS_2$, and (B) $MoS_2$. FIG. 10 demonstrates that transitional metal dichalcogenide particles can be assembled on PDMS hydrophobic substrates assisted by salt. NaCl was used an exemplary salt. The concentration of NaCl in the final solution was 1 mol/L and the particle concentrations of different particles was 5 mg/mL. The $SnS_2$ particles have an average size of 5 μm, and were obtained from Shanghai Yunfu Nano Technology Co., LTD of Shanghai, China. The $MoS_2$ particles have an average size of lower than 2 μm, and were obtained from Sigma-Aldrich, Inc. of Missouri, USA.

Figure 11:
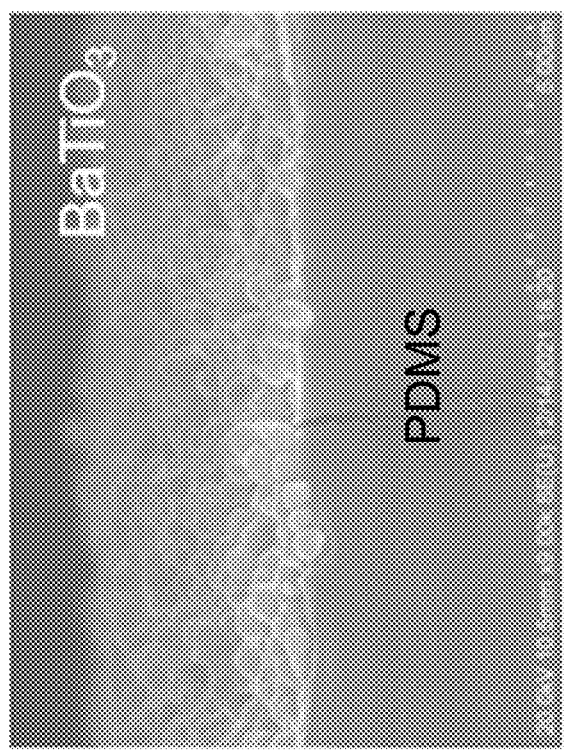
FIG. 11 shows tilted-angle SEM image of cross section view of assembled $BaTiO_3$ perovskite particles on PDMS assisted by NaCl as an exemplary salt.

FIG. 11 shows assembled $BaTiO_3$ perovskite particles on PDMS assisted by salt. FIG. 11 demonstrates that perovskite particles can be assembled on hydrophobic substrates assisted by salt. NaCl was used an exemplary salt. The concentration of NaCl in the final solution was 1 mol/L and the particle concentrations of $BaTiO_3$ perovskite was 5 mg/mL. The $BaTiO_3$ nanoparticles have an average size of 400 nm, and were obtained from Sigma-Aldrich, Inc. of Missouri, USA.

Figure 12:
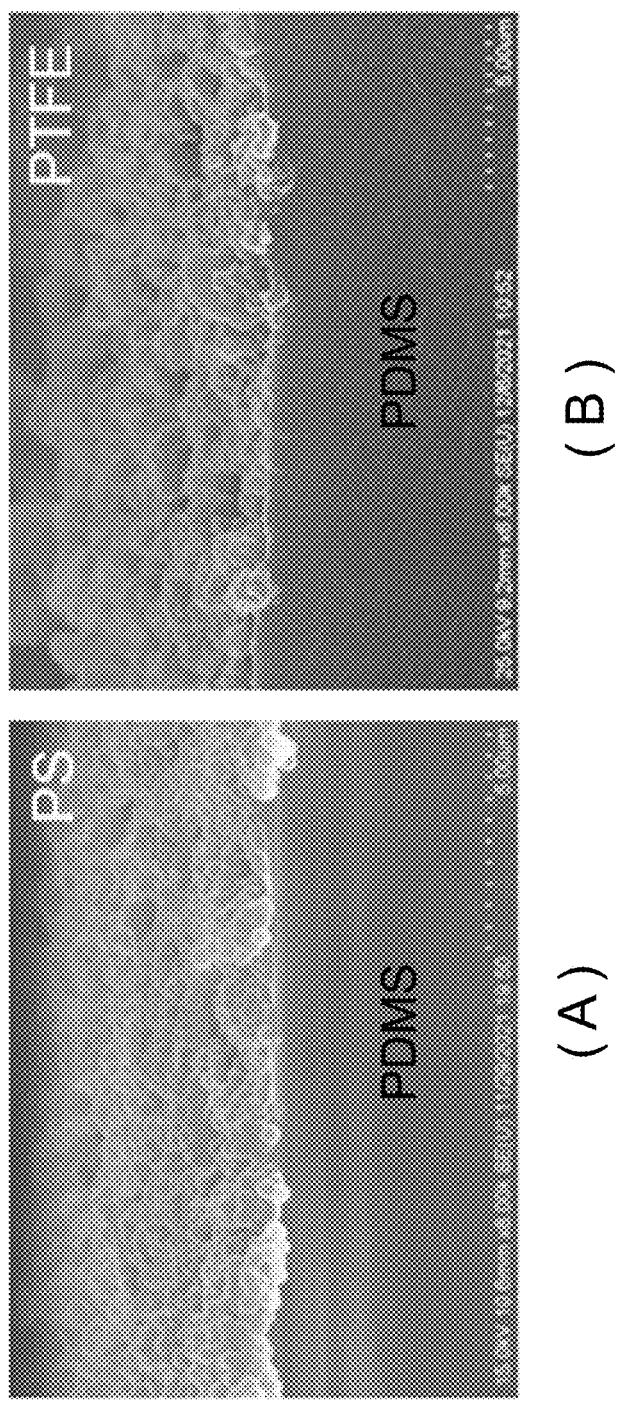
FIG. 12 shows tilted-angle SEM images of cross section view of various polymer particles assembled on PDMS assisted by NaCl as an exemplary salt: (A) Polystyrene (PS) sphere, and (B) Polytetrafluoroethylene (PTFE), in accordance with some embodiments.

FIG. 12 shows assembled polymer particles on PDMS assisted by salt: (A) PS, and (B) PTFE. FIG. 12 demonstrates that polymer particles can be assembled on hydrophobic substrates assisted by salt. NaCl was used an exemplary salt. The concentration of NaCl in the final solution was 1 mol/L and the particle concentrations of different particles was 5 mg/mL. The PS nanoparticles have an average size of 500 nm. The PTFE particles have an average size of 1 μm, and were obtained from Sigma-Aldrich, Inc. of Missouri, USA.

Figure 13:
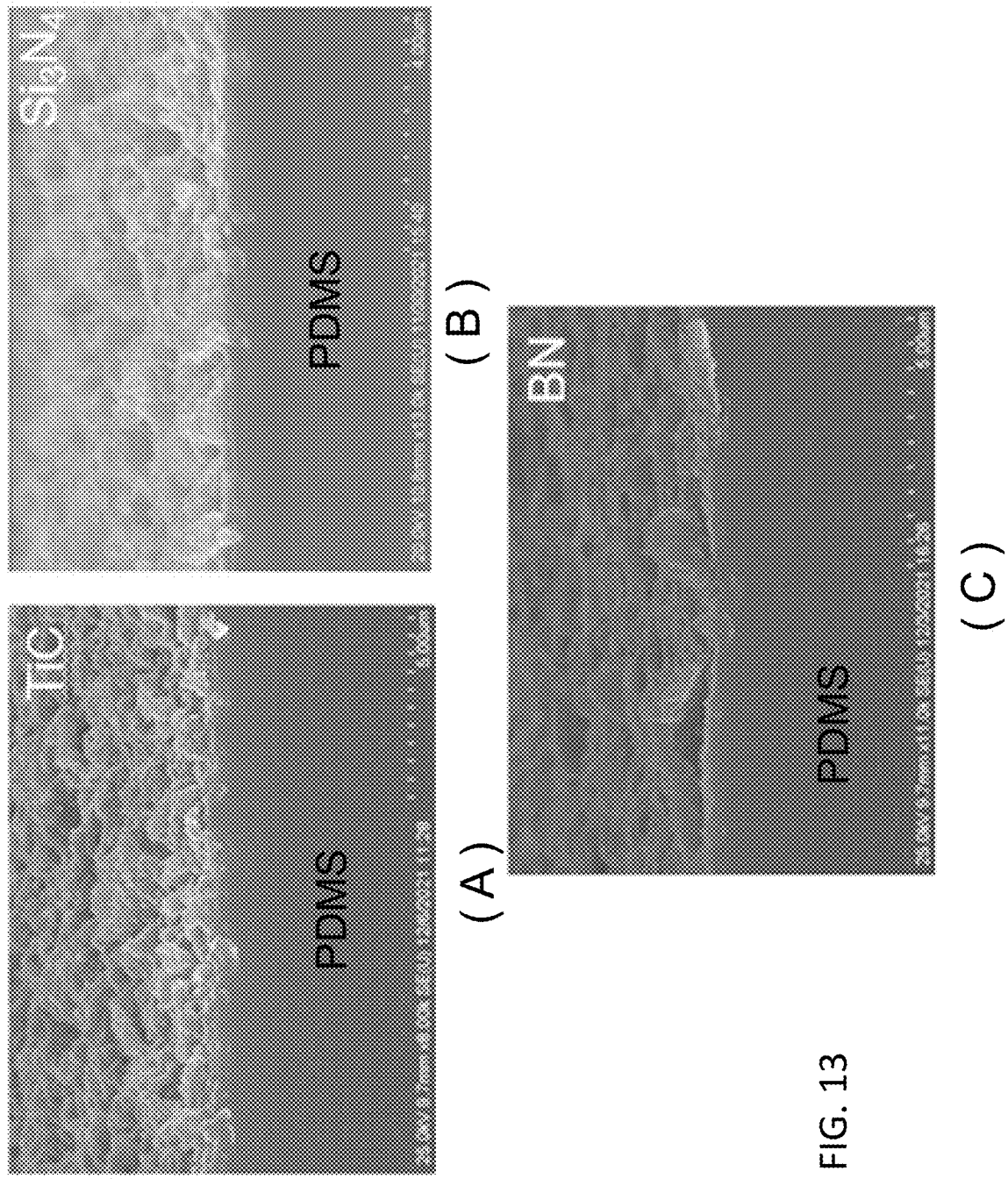
FIG. 13 shows SEM images of various carbide and nitride particles assembled on PDMS assisted by NaCl as an exemplary salt: (A) Titanium carbide (TiC), (B) Silicon nitride ($Si_3N_4$), and (C) Boron nitride (BN), in accordance with some embodiments.

FIG. 13 shows assembled carbide and nitride particles on PDMS assisted by salt: (A) TiC, (B) $Si_3N_4$, and (C) BN. FIG. 13 demonstrates that carbide and nitride particles can be assembled on hydrophobic substrates assisted by salt. NaCl was used an exemplary salt. The concentration of NaCl in the final solution was 1 mol/L and the particle concentrations of different particles were 5 mg/mL. The TiC nanoparticles have an average size of no more than 200 nm, and were obtained from Sigma-Aldrich, Inc. of Missouri, USA. The $Si_3N_4$ nanoparticles have an average size of 20 nm, and were obtained from SkySpring Nanomaterials, Inc. of Texas, USA. The BN particles have an average size of 1 μm, and were obtained from Sigma-Aldrich, Inc. of Missouri, USA.

It has been demonstrated that different salt species can be used in this salt assisted assembly system to induce assembly of particles on hydrophobic substrates. Examples of a suitable salt include, but are not limited to, LiCl, NaCl, KCl, $MgCl_2$, $AlCl_3$, $CaCl_2$, $ScCl_3$, $TiCl_4$, $MnCl_2$, $FeCl_3$, $CoCl_2$, $NiCl_2$, $CuCl_2$, $ZnCl_2$, $GaCl_3$, $GeCl_4$, $YCl_3$, $ZrCl_4$, $NbCl_5$, $MoCl_3$, $RuCl_3$, $RhCl_3$, $PbCl_2$, $CdCl_2$, $SbCl_3$, CsCl, $BaCl_2$, $LaCl_3$, $HfCl_4$, $WCl_6$, $ReCl_3$, $OsCl_3$, $AuCl_3$, $BiCl_3$, NaF, NaBr, NaI, $Na_2CO_3$, $NaNO_3$, $Na_2SO_4$, and any combination thereof. In some embodiments, the salt is a halide, a sulfate, a nitrate, or a carbonate of an alkali metal or alkali earth metal.

Salt species and concentration can affect the assembly process and the resultant structures. The salt can be used in a concentration in a range from 0.001 mol/L to a respective saturated solution at room temperature. The saturation concentration can be extended by increasing the temperature.

Figure 14:
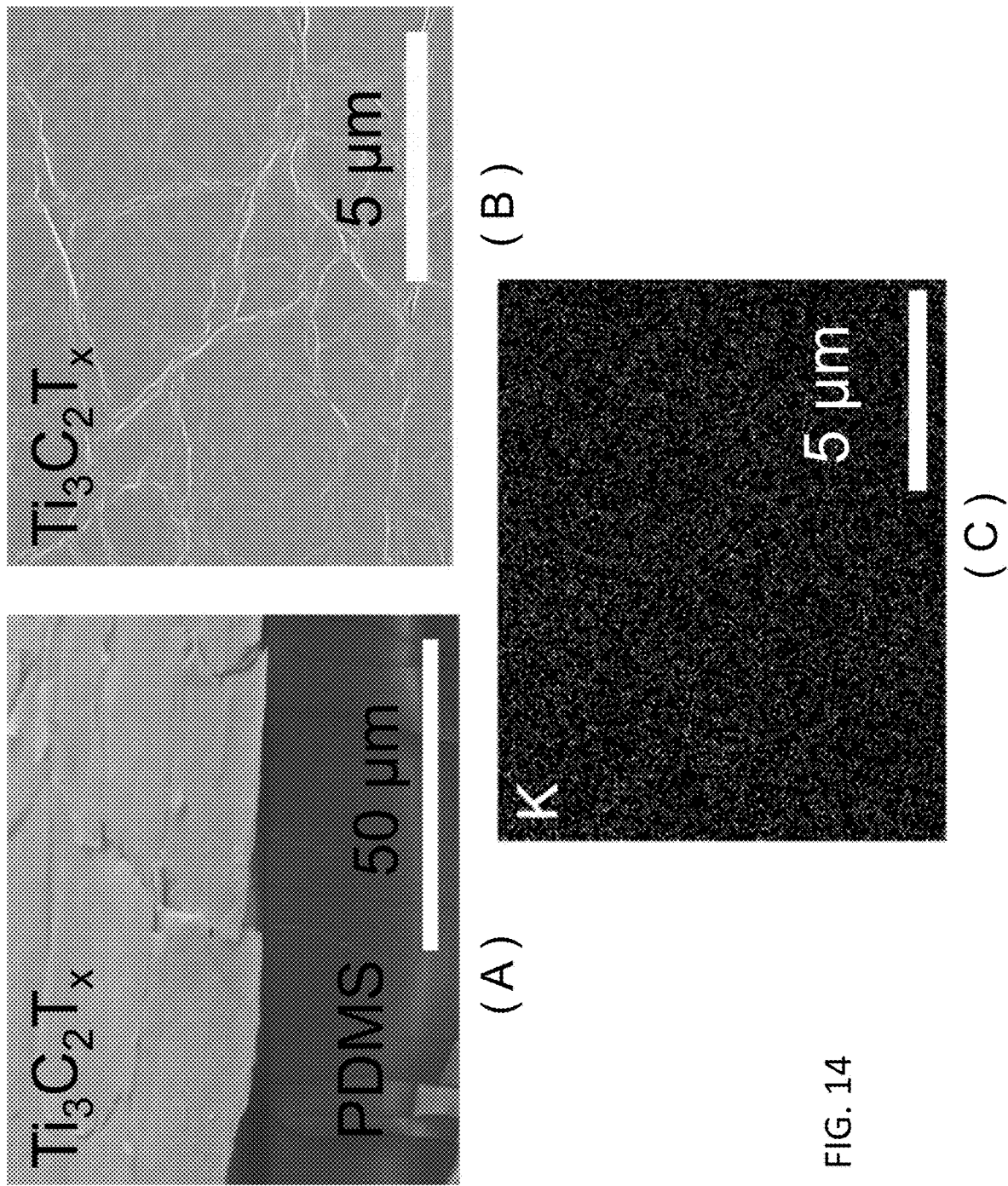
FIGS. 14 (A) and (B) show tilted angle view of fractured surface and top surface of $Ti_3C_2T_x$ assembled on PDMS substrate assisted by KCl salt, respectively.

FIGS. 14 (A) and (B) fractured surface and top surface of $Ti_3C_2T_x$ assembled on PDMS substrate assisted by KCl salt, respectively. FIG. 14 (C) shows the EDS mapping of K element in the image as shown in FIG. 14(B).

The results demonstrate that $Ti_3C_2T_x$ can also be assembled on PDMS assisted by a salt such as KCl with uniform structure. The potassium element from KCl can be absorbed on the $Ti_3C_2T_x$ surface with uniform distribution.

When salt is chosen as the solution solute in SAA, ions from the salt will adhere to the surface of particles. The Energy Dispersive Spectroscopy (EDS) mapping of element suggest cations are distributed across the surface of particles. In the samples as shown in FIG. 14(A)-C), KCl salt was used to assist the assembly of $Ti_3C_2T_x$ on PDMS substrate. $K^+$ ion can be absorbed on the $Ti_3C_2T_x$ surface. Similar phenomenon can also be extended to other salt addition, for example, CsCl, $MgCl_2$, $AlCl_3$, or any combination thereof. The concentration of different salts in the final solution was 0.01 mol/L and the $Ti_3C_2T_x$ concentration was 5 mg/mL.

Figure 15:
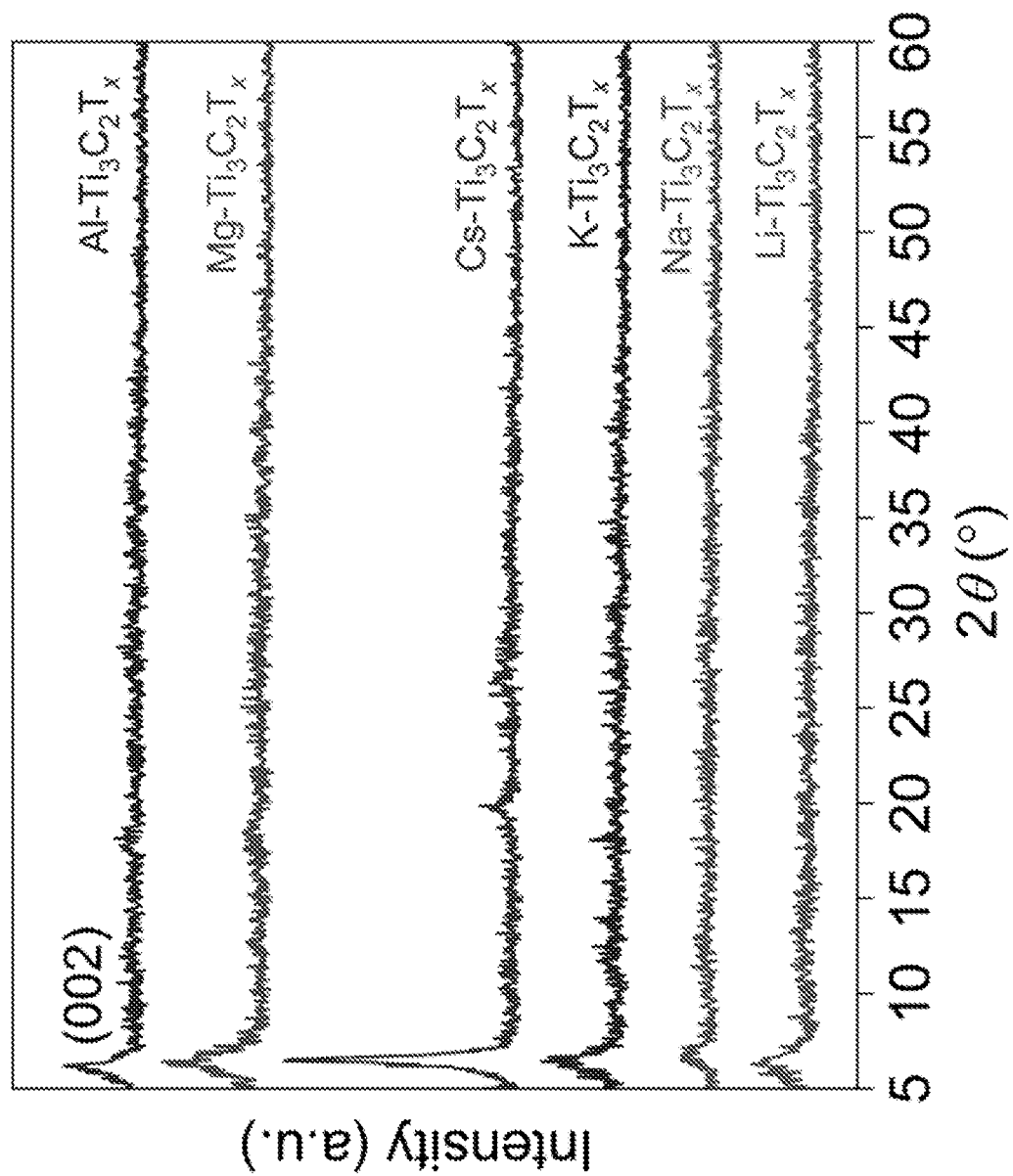
FIG. 15 shows X-ray diffraction (XRD) patterns of $Ti_3C_2T_x$ assemblies on PDMS using different salts.

FIG. 15 shows X-ray diffraction (XRD) patterns of $Ti_3C_2T_x$ assemblies on PDMS using different salts. Table 1 presents the d-spacing values of $Ti_3C_2T_x$ assemblies using different salts.

TABLE 1

| Sample | 2θ (°) | d-spacing along (002) plane (Å) |
|---|---|---|
| $Ti_3AlC_2$ | 9.50 ± 0.00 | 9.30 |
| $Ti_3C_2T_x$ | 7.40 ± 0.06 | 11.94 |
| Li—$Ti_3C_2T_x$ | 6.25 ± 0.05 | 14.13 |
| Na—$Ti_3C_2T_x$ | 6.68 ± 0.10 | 13.22 |
| K—$Ti_3C_2T_x$ | 6.43 ± 0.10 | 13.73 |
| Cs—$Ti_3C_2T_x$ | 6.45 ± 0.05 | 13.69 |
| Mg—$Ti_3C_2T_x$ | 6.33 ± 0.08 | 13.95 |
| Al—$Ti_3C_2T_x$ | 6.05 ± 0.09 | 14.60 |

The results show that adding a salt to the assembly system affects the particle-particle distance in the assembly. For layered material such as $Ti_3C_2T_x$, such a distance can be reflected by measuring the changes in interlayer spacing through X-ray powder diffraction (XRD). The results demonstrate that ions from salts can be absorbed by the particles and enlarge the interlayer spacing.

In the coating process for making the samples as described in FIG. 15 and Table 1, the concentration of different salts in the final solution was 0.01 mol/L and the $Ti_3C_2T_x$ concentrations was 5 mg/mL. The Li-$Ti_3C_2T_x$, Na-$Ti_3C_2T_x$, K-$Ti_3C_2T_x$, Cs-$Ti_3C_2T_x$, Mg-$Ti_3C_2T_x$, and Al-$Ti_3C_2T_x$ represent the samples with a salt used being LiCl, NaCl, KCl, CsCl, $MgCl_2$, and $AlCl_3$, respectively. The same definitions are applicable to the samples shown in FIG. 16 and Table 2.

Figure 16:
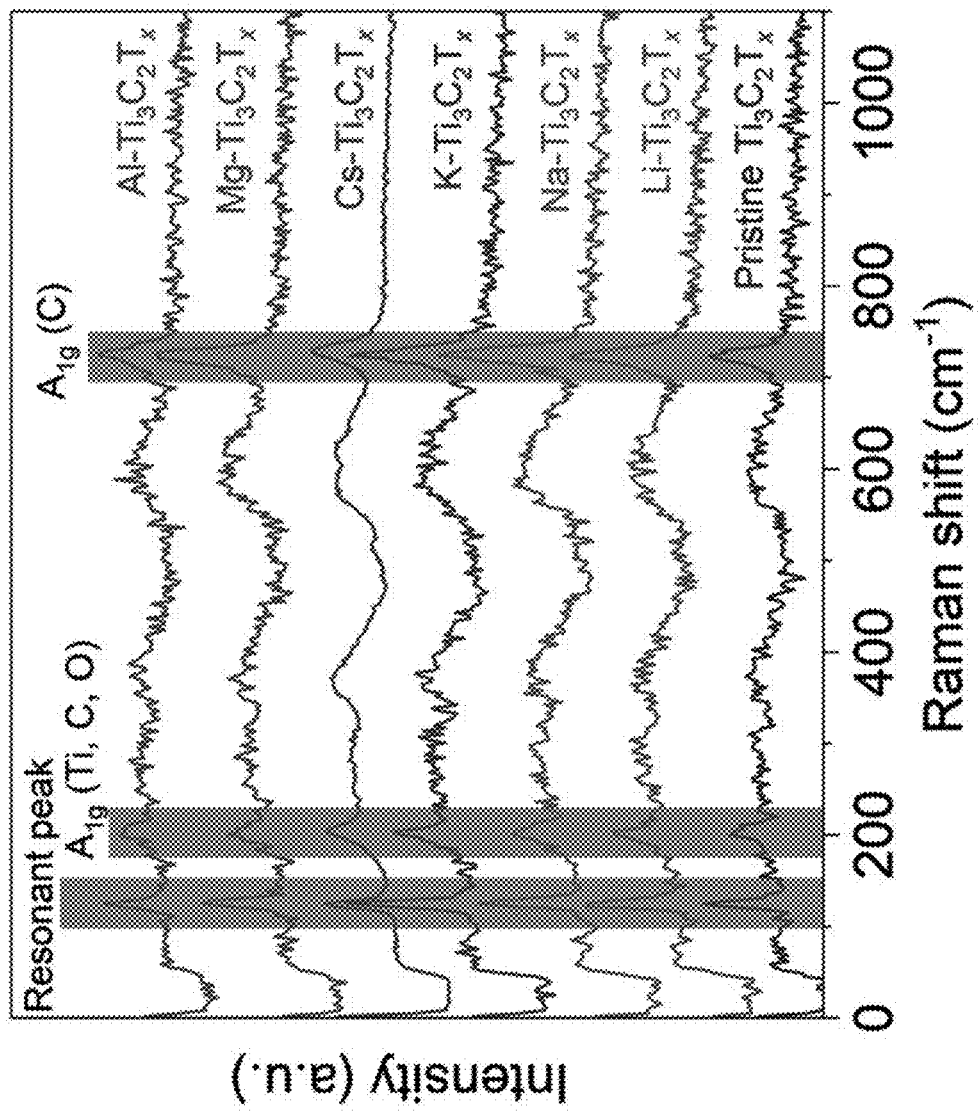
FIG. 16 shows Raman spectra of $Ti_3C_2T_x$ assemblies assisted by different salts.

FIG. 16 shows Raman spectra of $Ti_3C_2T_x$ assemblies assisted by different salts. The concentration of different salt in the final solution was 0.01 mol/L and the $Ti_3C_2T_x$ concentrations were 5 mg/mL. The results show that adding salt to the assembly system does not affect the chemical structure of the particles.

Table 2 illustrates the controllability of the thickness of the assembled $Ti_3C_2T_x$ with respect to the assembly time for different salt additions.

assembly time from 1 minute to 15 minute). The coating thickness can be adjusted by tailoring the salt species and assembly time. The thickness can be controlled from monolayer $Ti_3C_2T_x$ (1.8 nm in thickness) to multilayer stacks (up to several micrometers).

The assembly properties of SAA can be controlled by the assembly time and using different salts. For example, Table 3 shows the controllability of the sheet resistance of the assembled $Ti_3C_2T_x$ with respect to the assembly time for different salt additions. The results as shown in Table 3 demonstrate that the sheet resistance of assembled particles can be controlled by assembly time and salt selection.

TABLE 3

| Assembly time (min) | Sheet resistance of assembled $Ti_3C_2T_x$ on PDMS with different salts (Ω/sq) | | | | | |
|---|---|---|---|---|---|---|
| | LiCl | NaCl | KCl | CsCl | $MgCl_2$ | $AlCl_3$ |
| 1 | 1432 ± 325 | 1038 ± 284 | 881 ± 269 | 492 ± 84 | 592 ± 293 | 273 ± 172 |
| 2 | 1284 ± 264 | 509 ± 231 | 428 ± 84 | 204 ± 46 | 140 ± 60 | 82 ± 30 |
| 5 | 318 ± 19 | 226 ± 72 | 102 ± 21 | 63 ± 18 | 42 ± 23 | 47 ± 5.7 |
| 10 | 92 ± 8 | 50 ± 9 | 16 ± 5 | 4.2 ± 0.7 | 3.2 ± 3.0 | 34 ± 3.8 |
| 15 | 4.7 ± 0.3 | 3.7 ± 0.6 | 3.2 ± 0.6 | 3.4 ± 0.2 | 3.1 ± 0.6 | 10 ± 0.8 |

Figure 17:
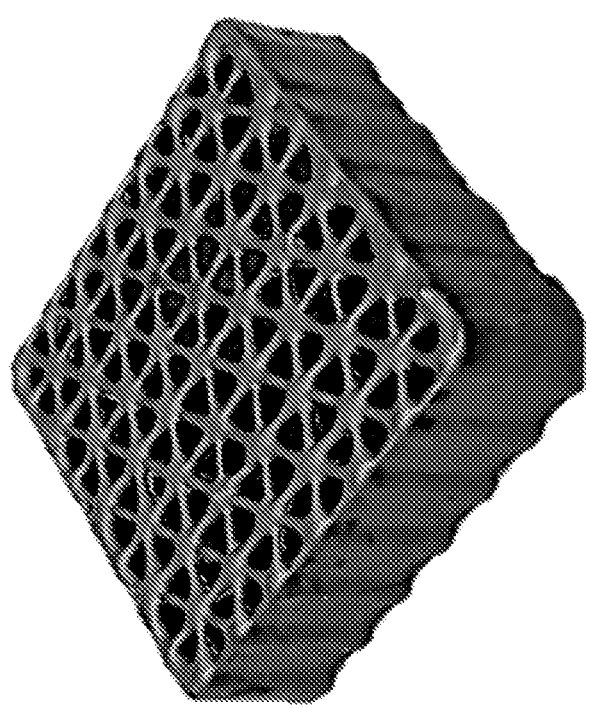
FIG. 17 shows $Ti_3C_2T_x$ assembly on 3D printed PDMS substrates with complicated structure assisted by NaCl as an exemplary salt.

FIG. 17 shows $Ti_3C_2T_x$ assembly on 3D printed PDMS substrates with complicated structure assisted by NaCl salt. A PDMS substrate is transparent or have a light color before coating. After coating with $Ti_3C_2T_x$, the sample surface is black. The result demonstrates that a solute assisted assembly (SAA) process is independent on the substrate shape and morphology. The method and the coating structure as described herein can be applicable to various substrates of different shapes and configurations.

Figure 18:
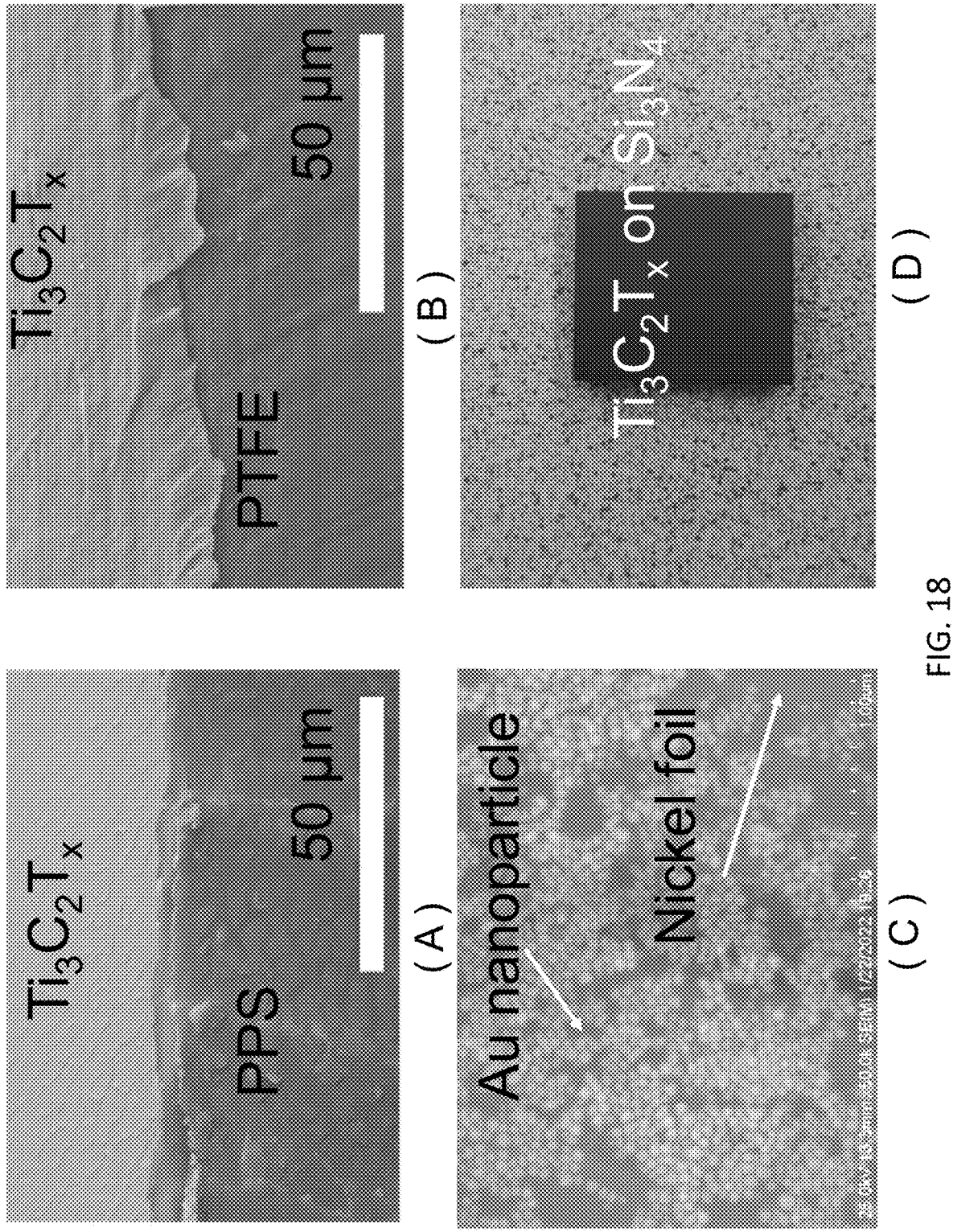
FIGS. 18 (A) and (B) show SEM images of $Ti_3C_2T_x$ assembled on PPS and PTFE substrates assisted by NaCl salt.

FIGS. 18 (A) and (B) show SEM images of $Ti_3C_2T_x$ assembled on PPS and PTFE substrates assisted by NaCl salt. FIG. 18(C) shows SEM image of Au nanoparticles assembled on nickel foil substrate. FIG. 18(D) shows digital image of $Ti_3C_2T_x$ assembled on $Si_3N_4$ ceramic substrate. The results in FIG. 18 demonstrate that $Ti_3C_2T_x$ can be assembled on flat PPS and PTFE substrates using SAA, Au nanoparticles on nickel foil substrate, and $Ti_3C_2T_x$ on $Si_3N_4$ ceramic substrate. NaCl was used as an exemplary salt. The concentration of NaCl in the final solution was 1 mol/L and the particle concentrations were 5 mg/mL. The Au nanoparticles have an average size of 50 nm, and were obtained from Sigma-Aldrich, Inc. of Missouri, USA.

The SAA method as described herein can be generalized to a wide range of substrates from organic polymer sub-

TABLE 2

| Assembly time (min) | Coating thickness of assembled $Ti_3C_2T_x$ on PDMS with different salts (nm) | | | | | |
|---|---|---|---|---|---|---|
| | LiCl | NaCl | KCl | CsCl | $MgCl_2$ | $AlCl_3$ |
| 1 | 15.1 ± 7.9 | 6.1 ± 5.9 | 8.8 ± 6.6 | 35.1 ± 24.7 | 83.3 ± 67.2 | 95.8 ± 83.4 |
| 2 | 18.2 ± 8.9 | 11.6 ± 9.4 | 10.4 ± 7.6 | 42.3 ± 29.1 | 89.0 ± 58.3 | 182.9 ± 125.7 |
| 5 | 56.2 ± 36.9 | 38.8 ± 24.9 | 90.1 ± 47.6 | 443.7 ± 226.3 | 276.4 ± 153.8 | 437.1 ± 243.9 |
| 10 | 101.0 ± 36.4 | 90.4 ± 31.0 | 120.1 ± 53.3 | 621.4 ± 309.1 | 323.3 ± 149.7 | 906.4 ± 476.8 |
| 15 | 247.1 ± 58.4 | 131.5 ± 39.7 | 257.5 ± 96.4 | 1784.0 ± 498.4 | 1189.3 ± 724.3 | 1473.1 ± 567.5 |

The assembly process of SAA can be controlled by the assembly time. This results in Table 2 demonstrate that the coating thickness of assembled $Ti_3C_2T_x$ can be controlled at nanoscale accuracy (e.g., from 6.1 nm to 1784 nm by strates to metal and ceramic substrates. Similar phenomenon can be extended to PP, HDPE, UHMWPE, PVDF, PET, PEEK, ABS, PC, epoxy, PES, PA-6, PI, and PBI as a substrate.

As described, nanomaterials such as MXenes or particles can be assembled on different substrates, which can be flat or non-flat configuration. The substrates may be films made of a polymer such as the PDMS (10:1) substrate described. The nanomaterials such as MXenes or particles can be also assembled on a patterned polymer (such as PDMS) substrate. The substrates such as polymer substrates are hydrophobic. The nanomaterials such as MXenes or particles can be assembled on various hydrophobic polymer (such as PP) microfibers.

Figure 19:
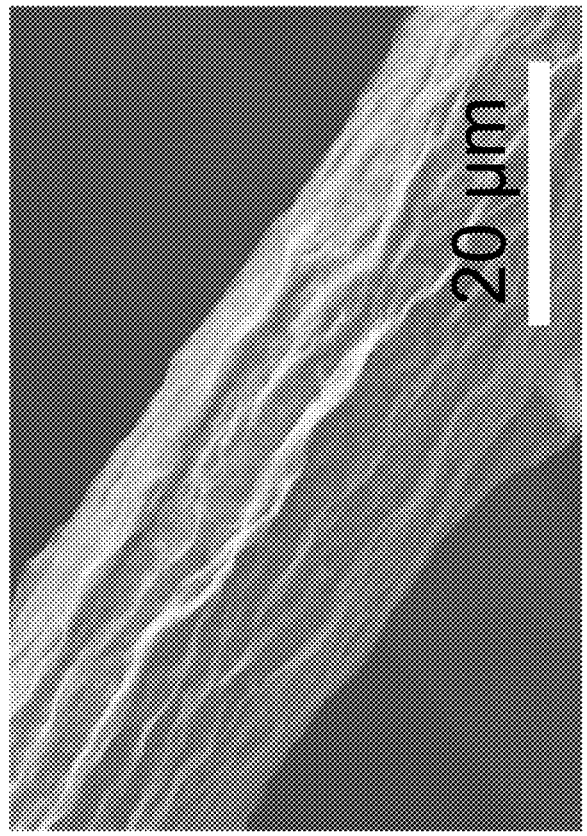
FIG. 19 shows SEM images at low magnification (A) and high magnification (B) illustrating $Ti_3C_2T_x$ assembly on PP fibers assisted by NaCl salt.
Figure 19:
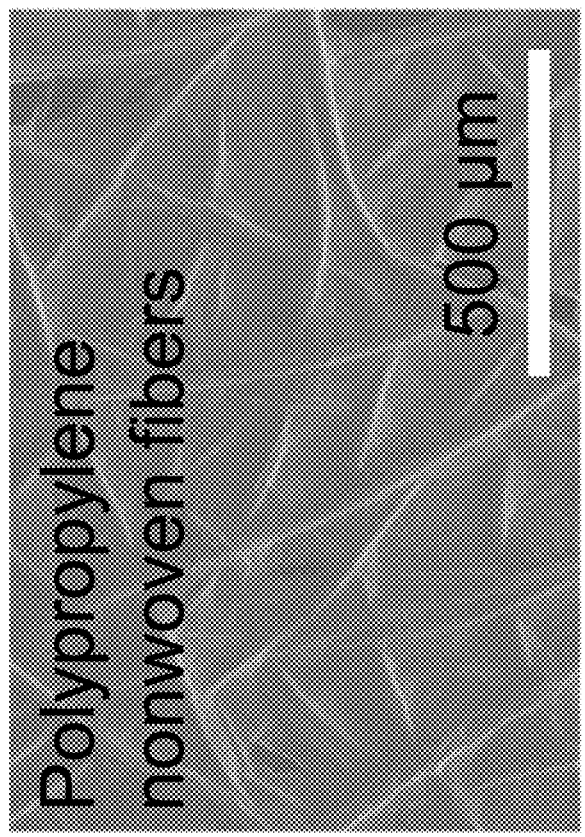

FIG. 19 shows SEM images at low magnification (A) and high magnification (B) illustrating $Ti_3C_2T_x$ assembly on PP fibers assisted by NaCl salt. The PP fibers are hydrophobic PP microfibers.

These results demonstrate that the SAA process can be used to assemble particles such as $Ti_3C_2T_x$ on polypropylene (PP) fibers as exemplary fibers. According to the diameter of the fibers and pore size of the textiles, the particles can bridge multiple fibers and/or wrap single fiber. Similar assemblies are demonstrated on PET fibers, UHMWPE fibers, and Kevlar fibers.

Figure 20:
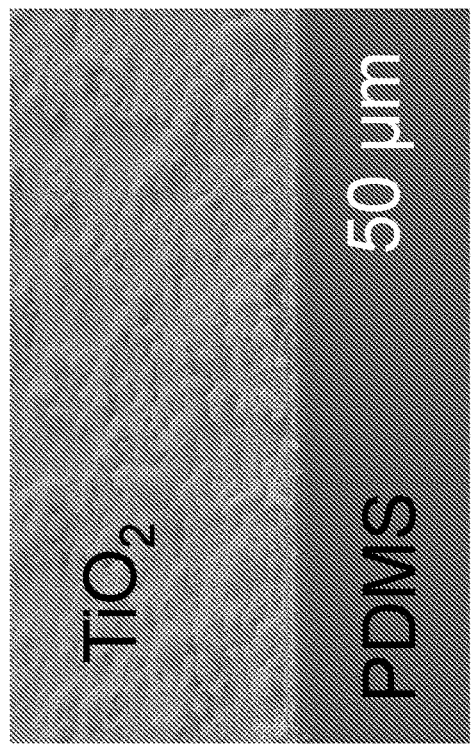
FIGS. 20-21 show a tilted-angle SEM image of cross section view (A) of $TiO_2$ nanoparticles assembled on PDMS substrate assisted by NaCl and KCl combination salts, and the energy dispersive X-ray spectroscopy (EDS) mapping of Ti, O, Na, K, and Cl elements in the SEM image.
Figure 20:
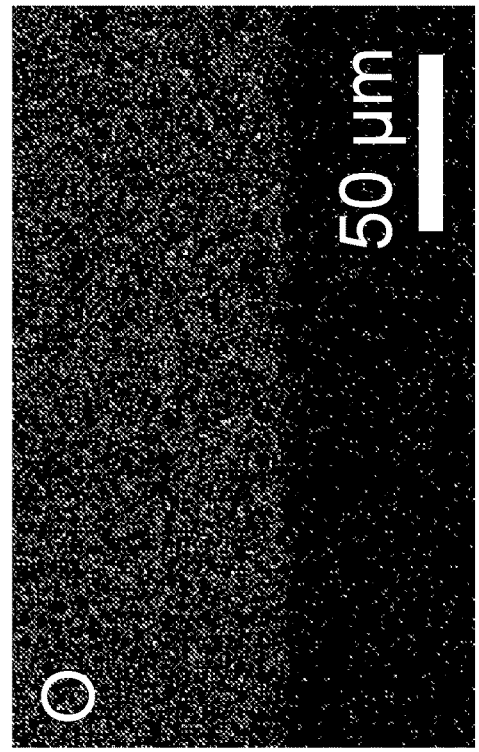
Figure 20:
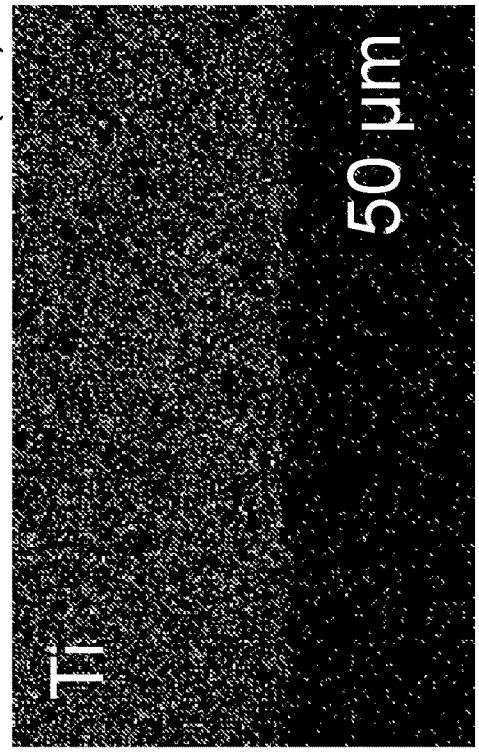
Figure 21:
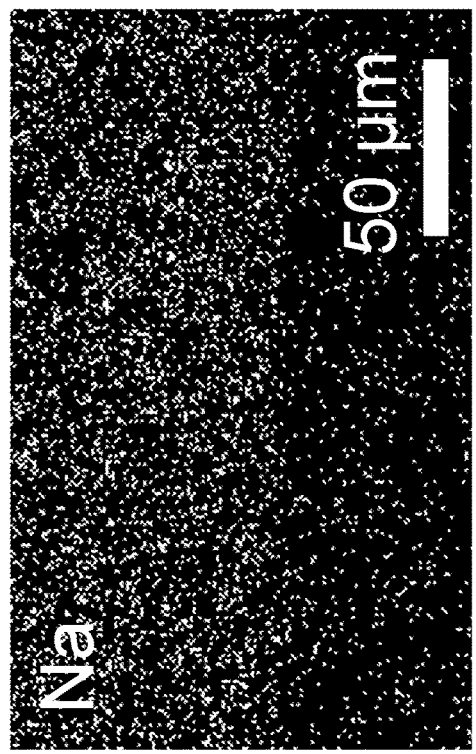
Figure 21:
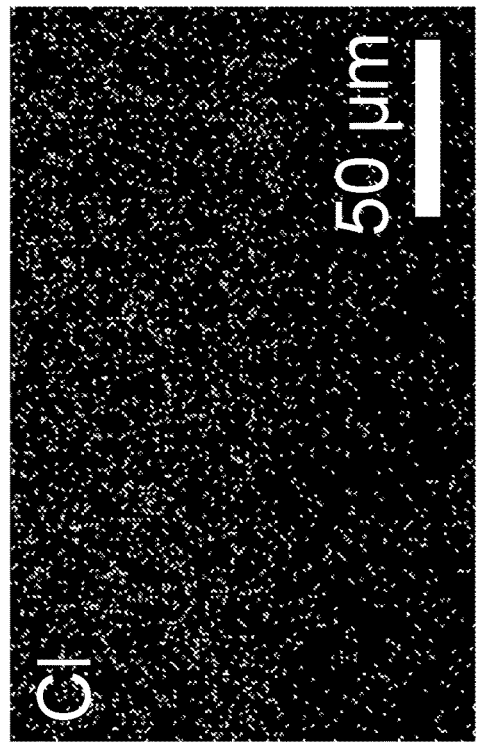
Figure 21:

FIGS. 20-21 show a SEM image of $TiO_2$ nanoparticles assembled on PDMS substrate assisted by NaCl and KCl combination salts, and the energy disperse spectroscopy (EDS) mapping of Ti, O, Na, K, and Cl elements in the SEM image. The SEM image is shown in (A) of FIG. 20, and the EDS mapping of Ti, O, Na, K, and Cl elements is shown in (B) and (C) of FIGS. 20 and (A), (B), and (C) of FIG. 21, respectively.

The concentration of $TiO_2$ nanoparticles is 10 mg/mL, and the concentration of both NaCl and KCl is 1 mol/L. The Cu nanoparticles have an average size of 25 nm, and were obtained from SkySpring Nanomaterials, Inc. of Texas, USA.

Figure 22:
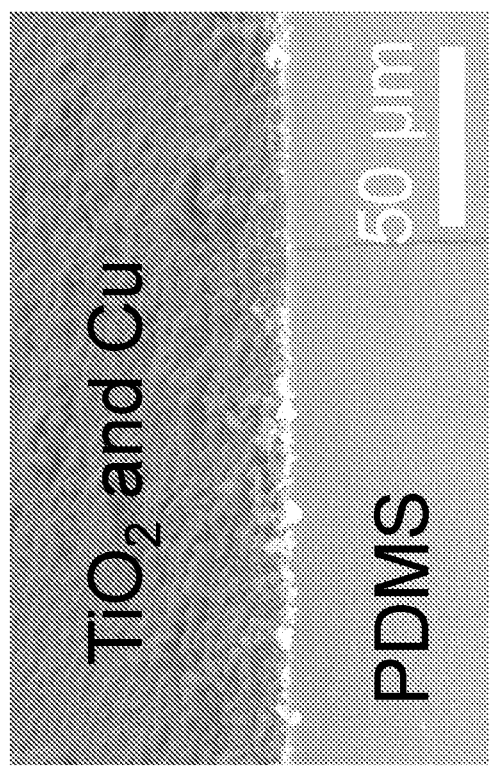
FIGS. 22-23 show a tilted-angle SEM image of cross section view (A) of $TiO_2$ and Cu mixed nanoparticles assembled on PDMS assisted by NaCl salt, and the EDS mapping of Ti, O, Cu, Na, and Cl elements in the SEM image.
Figure 22:
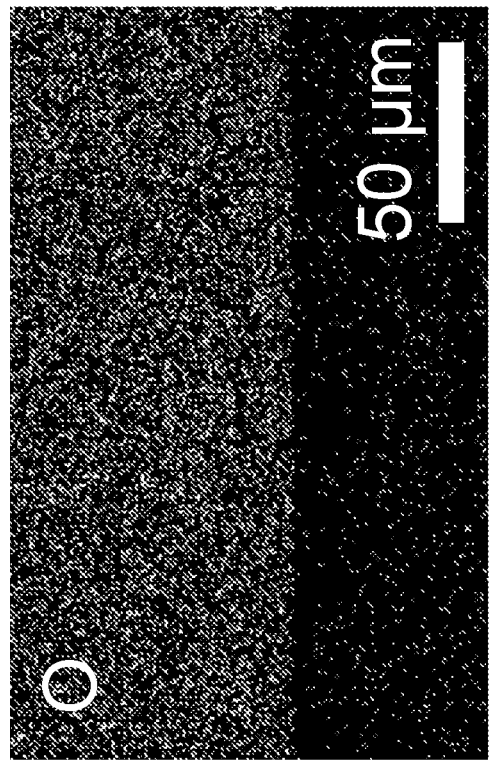
Figure 22:
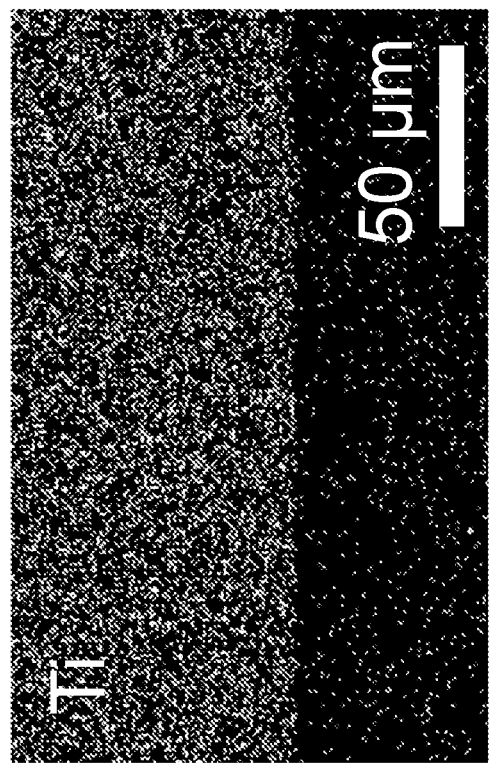
Figure 23:
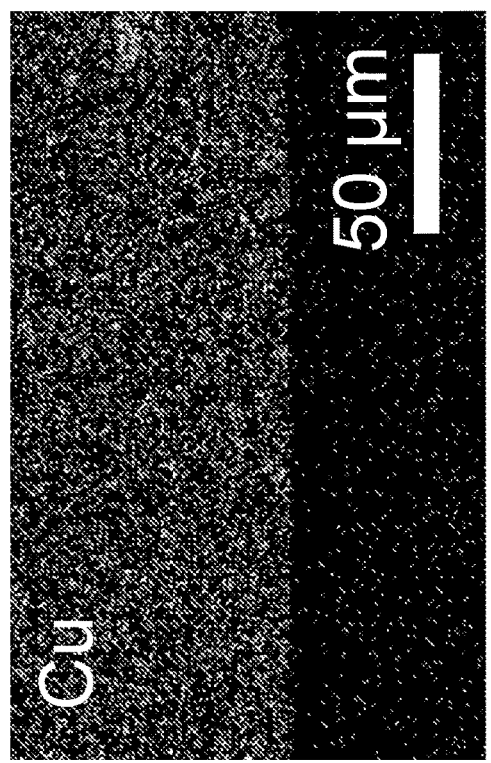
Figure 23:
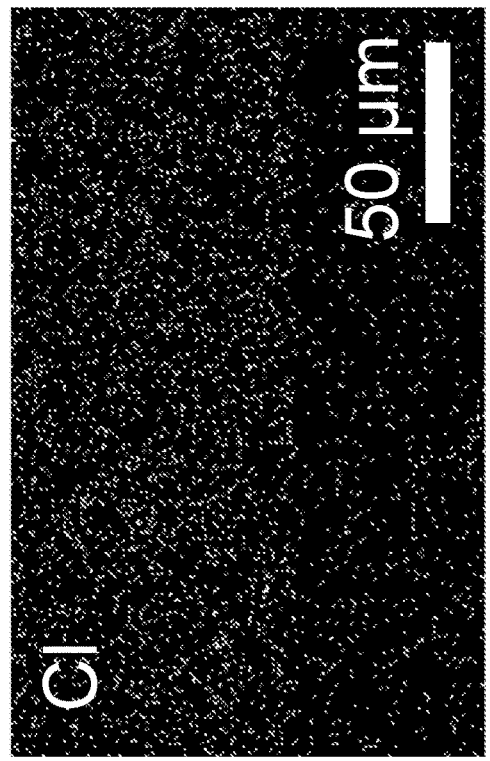
Figure 23:

FIGS. 22-23 show a SEM image of $TiO_2$ and Cu mixed nanoparticles assembled on PDMS assisted by NaCl salt, and the EDS mapping of Ti, O, Cu, Na, and Cl elements in the SEM image. The SEM image is shown in (A) of FIG. 22, and the EDS mapping of Ti, O, Cu, Na, and Cl elements is shown in (B) and (C) of FIG. 22 and (A), (B) and (C) of FIG. 23, respectively.

The concentration of both $TiO_2$ and Cu nanoparticles is 5 mg/mL, and the concentration of NaCl is 1 mol/L.

Figure 24:
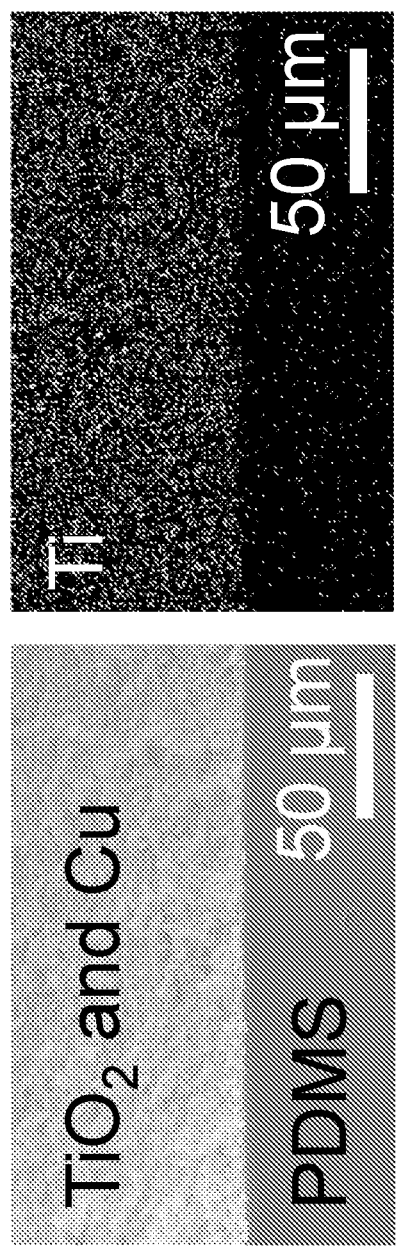
FIGS. 24-25 show a tilted-angle SEM image of cross section view (A) of $TiO_2$ and Cu mixed nanoparticles assembled on PDMS assisted by NaCl and KCl combination salts, and the EDS mapping of Ti, O, Cu, Na, K, and Cl elements in the SEM image.
Figure 24:
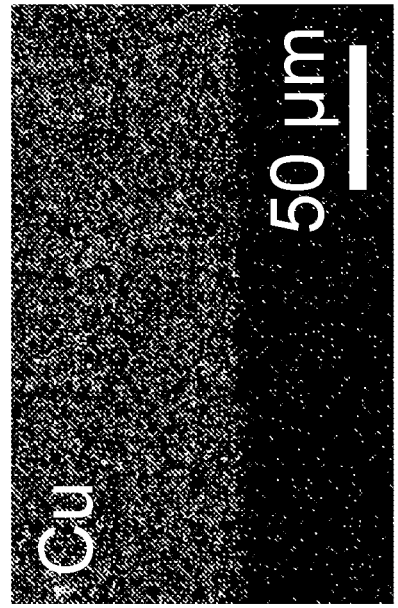
Figure 24:
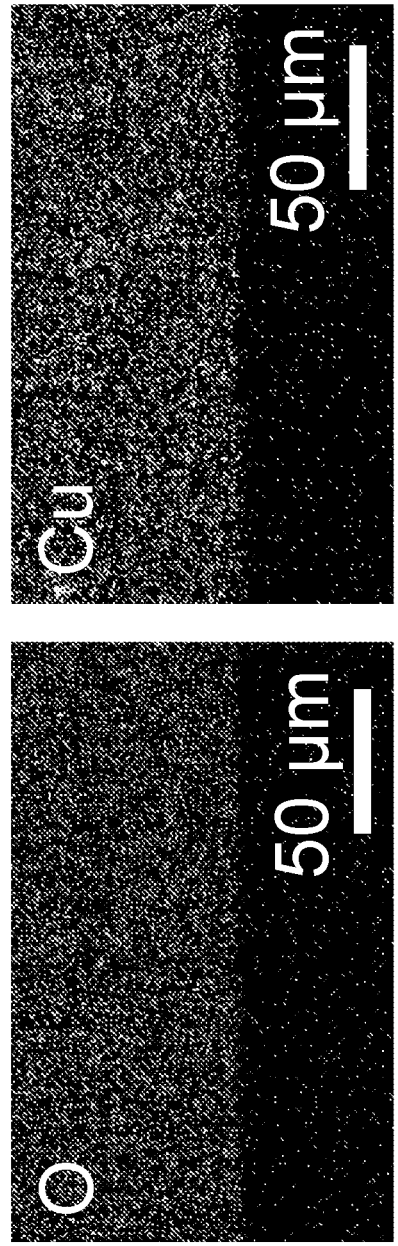
Figure 25:
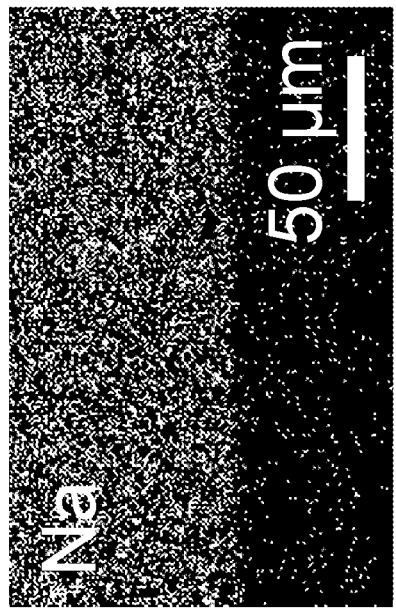
Figure 25:
Figure 25:

FIGS. 24-25 show a SEM image of $TiO_2$ and Cu mixed nanoparticles assembled on PDMS assisted by NaCl and KCl combination salts, and the EDS mapping of Ti, O, Cu, Na, K, and Cl elements in the SEM image. The SEM image is shown in (A) of FIG. 24, and the EDS mapping of Ti, O, Cu, Na, K and Cl elements is shown in (B), (C), and (D) of FIG. 24 and (A), (B) and (C) of FIG. 25, respectively.

The concentration of both $TiO_2$ and Cu nanoparticles is 5 mg/mL, and the concentration of both NaCl and KCl is 1 mol/L.

The examples in FIGS. 20-25 show successfully assembly using different combinations of solutes and/or particles. For example, these combinations include, but are not limited to salt combination (e.g., NaCl and KCl) and one particle (e.g., $TiO_2$) species; particle combination (e.g., $TiO_2$ and Cu) and one salt (e.g., NaCl) species; salt combination (e.g., NaCl and KCl) and particle (e.g., $TiO_2$ and Cu) combination. In addition, the number of combination of solute (e.g., salts, sugars, acids, bases) and/or particles as described herein can be two to a large number.

Figure 26:
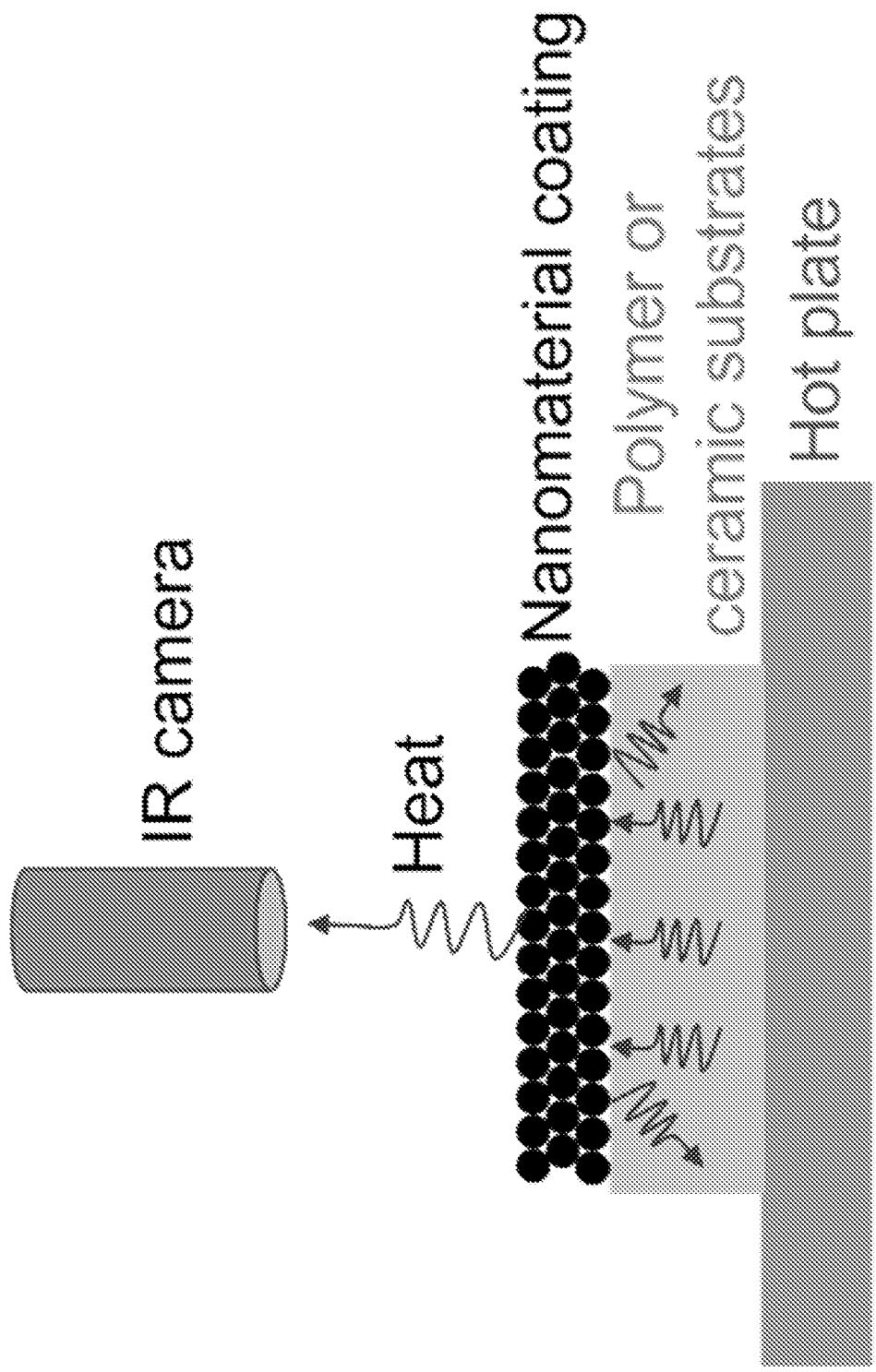
FIG. 26 illustrates an exemplary setup for high temperature thermal camouflage measurement in accordance with some embodiments.

FIG. 26 illustrates an exemplary setup for high temperature thermal camouflage measurement in accordance with some embodiments. The set-up is shown in a section view.

As shown in FIG. 26, a coated sample is disposed on a hot plate configured to be heated up to an increased temperature. The hot plate is a heat source for the coated sample. The coated sample may include a substrate, which may be made of a polymer, a ceramic, or any other substrate as described above. A coating comprising nanomaterial or particles as described above is disposed on the substrate. An IR camera is disposed above the coated sample and is configured to measure and map the temperatures on the sample, and provide an image showing the temperature distribution.

For the coating process, the particle solution and solute solution were mixed together under sonication. The substrate was dipped in and out the resultant mixed solution and the uniform coating was formed on the surface of substrate. The solute and particle concentrations was 0.01 mol/L and 5 mg/mL, respectively.

Figure 27:
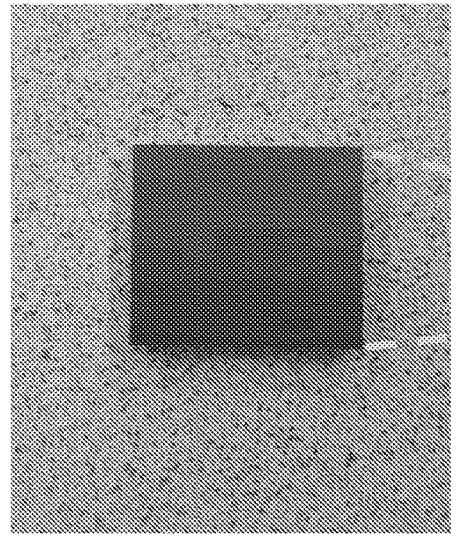
FIGS. 27 (A) and (B) show digital images of $Si_3N_4$ ceramic substrates with and without $Ti_3C_2T_x$ coating.
Figure 27:
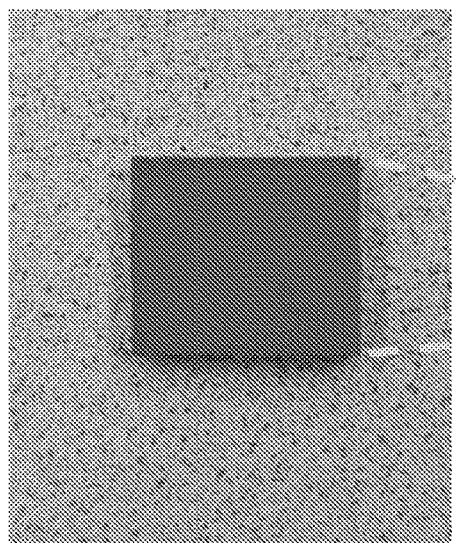
Figure 27:
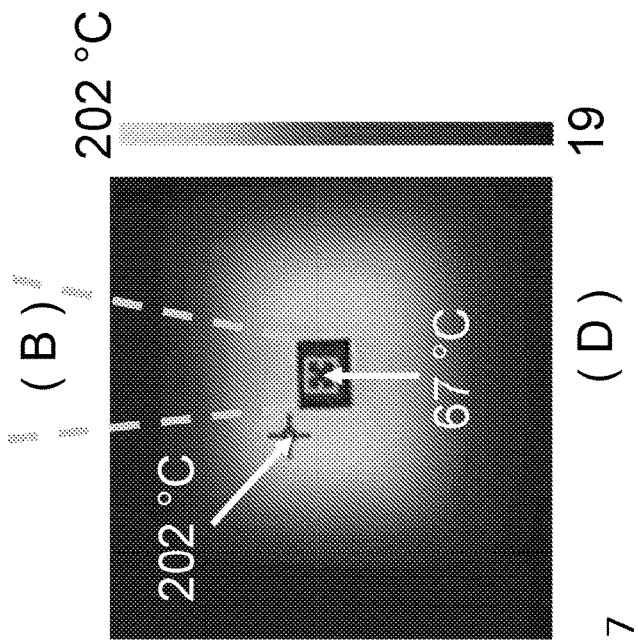
Figure 27:
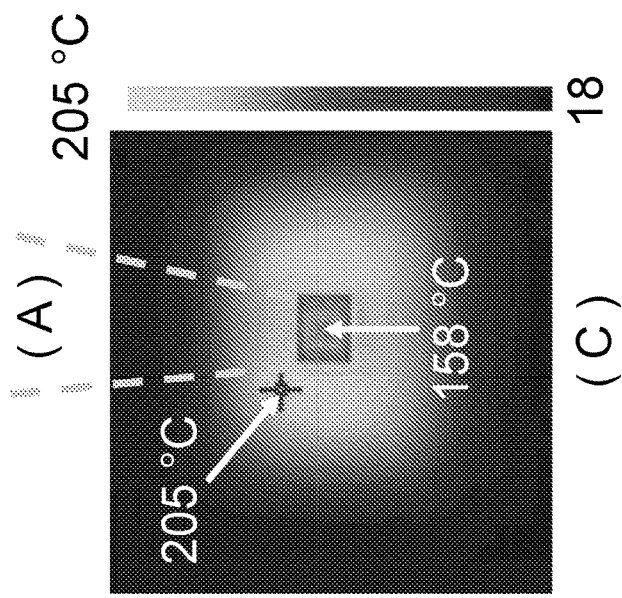

FIGS. 27 (A) and (B) show digital images of $Si_3N_4$ ceramic substrates with and without $Ti_3C_2T_x$ coating. FIG. 27 (C) shows the temperature of the top surface of $Si_3N_4$ ceramic substrate reaches 158° C. when the hot plate temperature is 205° C. FIG. 27 (D) shows the temperature of the top surface of $Ti_3C_2T_x$ coated on $Si_3N_4$ ceramic substrate reaches 67° C. when the hot plate temperature is 202° C. These results show the $Ti_3C_2T_x$ coated $Si_3N_4$ ceramic substrate has thermal camouflage capability. In these examples, the salt used is NaCl. The NaCl and $Ti_3C_2T_x$ concentrations were 0.01 mol/L and 5 mg/mL, respectively. $Ti_3C_2T_x$ is one two dimensional nanomaterials with layered alternative Ti and C atom layers. The structure endows this material with high reflectivity of IR light. Therefore, the $Ti_3C_2T_x$ assembly obtained has capability of thermal camouflage.

The results in FIG. 27 show that solute assisted assembly of nanomaterials on substrates has potentials in the application of thermal camouflage. For the similar application, the nanoparticles can be extended to e.g., graphene, MWNT, metal particles. The solute can be salt, sugar, acid, base, or a combination thereof.

As described herein, the present disclosure provides an article comprising a substrate and a coating disposed on the substrate. The coating comprises a nanomaterial or particle and a solute distributed in the coating. The solute may be a salt, a sugar, an acid, a base, or any combination thereof. The solute is soluble in a solvent such as water or water-containing mixture solvent. The nanomaterial or particle may be hydrophilic while the substrate is hydrophobic, or the nanomaterial or particle is hydrophobic while the substrate is hydrophilic.

The nanomaterial or particle may be a metal, an oxide, a metal hydroxide not soluble in water, a metal salt not soluble in water, a transition metal chalcogenide, a carbide, a nitride, a carbonitride, a single element material, a polymer, a protein, or any combination thereof. The substrate may comprise a polymer, a glass sheet, a metal foil, a paper, or a combination thereof.

The nanomaterial or particle may have a suitable size, for example, in a range of from about 1 nm to about 10 microns. For example, the nanomaterial or particle comprises nanomaterials having at least one dimension in a range of from about 1 nm to about 1,000 nm, for example, from about 10 nm to about 1,000 nm. In some embodiments, the nanomaterial or particle comprises microparticles having a diameter in a range of from about 1 micron to about 10 microns.

In some embodiments, the solute comprises one or more water-soluble salts. The nanomaterial or particle is hydrophilic, and the substrate comprises a polymer, which may be hydrophobic In some embodiments, the coating comprises layered nanomaterials, and the layered nanomaterials have a size of spacing controlled by species of the solute.

The coating may have a thickness in a range of from about 1 nanometer to about 100 microns, for example, from 1 nm to 100 nm, from about 1 micron to 100 microns, or any suitable thickness.

In some embodiments, the nanomaterials or particles are chemically bonded with each other in the coating. For example, the nanomaterials or particles are hydrophilic and contains hydroxyl groups on the surface. The hydroxyl groups react with each other to provide chemical bonding. For some hydrophobic particles without any active groups on the surface, the particles are held together with each other in the coating through Van der Waals force.

The resulting article product comprising the assembled nanomaterial coating and the substrate, such as a polymer substrate, can be utilized to make flexible electronics, functional textile, thermal management materials, and any other materials of suitable applications.

Although the subject matter has been described in terms of exemplary embodiments, it is not limited thereto. Rather, the appended claims should be construed broadly, to include other variants and embodiments, which may be made by those skilled in the art.

What is claimed is:

1. A method, comprising steps of:
providing a mixture comprising a solvent, a solute, and a nanomaterial or particle, wherein the solute is selected from the group consisting of a salt, a sugar, and any combination thereof, wherein the solute is soluble in the solvent;
applying sonication to the mixture; and
contacting a substrate with the mixture so as to form a coating of the nanomaterial or the particle onto the substrate.

2. The method of claim 1, wherein the nanomaterial or particle is hydrophilic while the substrate is hydrophobic, or the nanomaterial or particle is hydrophobic while the substrate is hydrophilic.

3. The method of claim 1, wherein the nanomaterial or particle is selected from the group consisting of a metal, an oxide, a metal hydroxide not soluble in water, a metal salt not soluble in water, a transition metal chalcogenide, a carbide, a nitride, a carbonitride, a single element material, a polymer, or any combination thereof.

4. The method of claim 1, wherein the nanomaterial is exfoliated and/or dispersed after sonication is applied.

5. The method of claim 1, wherein the substrate comprises a polymer, a glass sheet, a metal foil, a paper, or a combination thereof.

6. The method of claim 1, wherein the substrate is contacted with the mixture through a dip coating process, a roll-to-roll process, a mechanical stirring process, or a combination thereof.

7. The method of claim 1, wherein the coating comprises layered nanomaterials, and the layered nanomaterials have a size of spacing, which is controlled by a species of the solute, wherein the solute is a salt, and ions of the salt enlarges an interlayer spacing between two adjacent layers of the layered nanomaterials so as to control the size of spacing.

8. The method of claim 1, wherein the nanomaterial or particle has a size in a range of from about 1 nm to about 10 microns.

9. The method of claim 1, wherein the nanomaterial or particle comprises nanomaterials having at least one dimension in a range of from about 1 nm to about 1,000 nm.

10. The method of claim 1, wherein the nanomaterial or particle comprises microparticles having a diameter in a range of from about 1 micron to about 10 microns.

11. The method of claim 1, wherein the solute comprises one or more salts.

12. The method of claim 11, wherein the nanomaterial or particle is hydrophilic, and the substrate comprises a polymer.

13. The method of claim 1, wherein the solvent is water or comprises water and another solvent.

14. The method of claim 1, wherein the mixture contains no surfactant.

* * * * *